(12) United States Patent
Meissner et al.

(10) Patent No.: US 9,291,481 B2
(45) Date of Patent: Mar. 22, 2016

(54) OPTICAL POSITION-MEASURING DEVICE

(71) Applicant: DR. JOHANNES HEIDENHAIN GMBH, Traunreut (DE)

(72) Inventors: Markus Meissner, Uebersee (DE); Wolfgang Holzapfel, Obing (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 178 days.

(21) Appl. No.: 14/135,043

(22) Filed: Dec. 19, 2013

(65) Prior Publication Data

US 2014/0185057 A1    Jul. 3, 2014

Related U.S. Application Data

(60) Provisional application No. 61/739,883, filed on Dec. 20, 2012.

(30) Foreign Application Priority Data

Dec. 20, 2012 (DE) .......................... 10 2012 223 887

(51) Int. Cl.
    *G01B 11/02*    (2006.01)
    *G01D 5/38*     (2006.01)
    *G01B 11/00*    (2006.01)

(52) U.S. Cl.
    CPC ................ *G01D 5/38* (2013.01); *G01B 11/002* (2013.01)

(58) Field of Classification Search
    CPC ..... G01D 5/38; G01D 5/347; G01D 5/34715; G01D 3/34746; G01B 11/002; G01B 11/005; G01B 9/02015; G01B 9/02017; G01B 9/02019; G01B 2290/30; G01B 21/04; G01B 21/042
    USPC .......................................................... 356/500
    See application file for complete search history.

(56) References Cited

U.S. PATENT DOCUMENTS

| 5,104,225 A       | 4/1992 | Masreliez |
| 6,020,964 A       | 2/2000 | Loopstra et al. |
| 7,573,581 B2      | 8/2009 | Holzapfel |
| 2012/0032067 A1*  | 2/2012 | Goodwin ............. G01B 11/002 250/225 |
| 2013/0194584 A1   | 8/2013 | Holzapfel et al. |

FOREIGN PATENT DOCUMENTS

| DE | 10 2012 201 393 | 8/2013 |
| EP | 1 762 828       | 3/2007 |
| WO | 2011/126610     | 10/2011 |

OTHER PUBLICATIONS

European Search Report, dated Mar. 14, 2014, issued in corresponding European Patent Application No. 13194826.7.

* cited by examiner

*Primary Examiner* — Tarifur Chowdhury
*Assistant Examiner* — Jonathon Cook
(74) *Attorney, Agent, or Firm* — Kenyon & Kenyon LLP

(57) ABSTRACT

An optical position-measuring device is adapted to detect the position of an object in several spatial degrees of freedom. The object is disposed in a manner allowing it to move at least along a first direction of movement and along a second direction of movement. The position-measuring device includes at least one light source and at least one first and second measuring standard which are located on the object, extend along a first extension direction and a second extension direction and include graduation regions disposed periodically along the first and second extension directions. In addition, a scanning plate is provided, into which at least first and second retroreflector elements are integrated, the first retroreflector element extending parallel to the first extension direction and the second retroreflector element extending parallel to the second extension direction, and via which, sub-beams that fall on them from the first and second measuring standard, are reflected back in the direction of the respective measuring standard. From superposed sub-beams, a detector system is able to generate position signals at least with respect to the movement of the object along the first and second direction of movement.

14 Claims, 17 Drawing Sheets

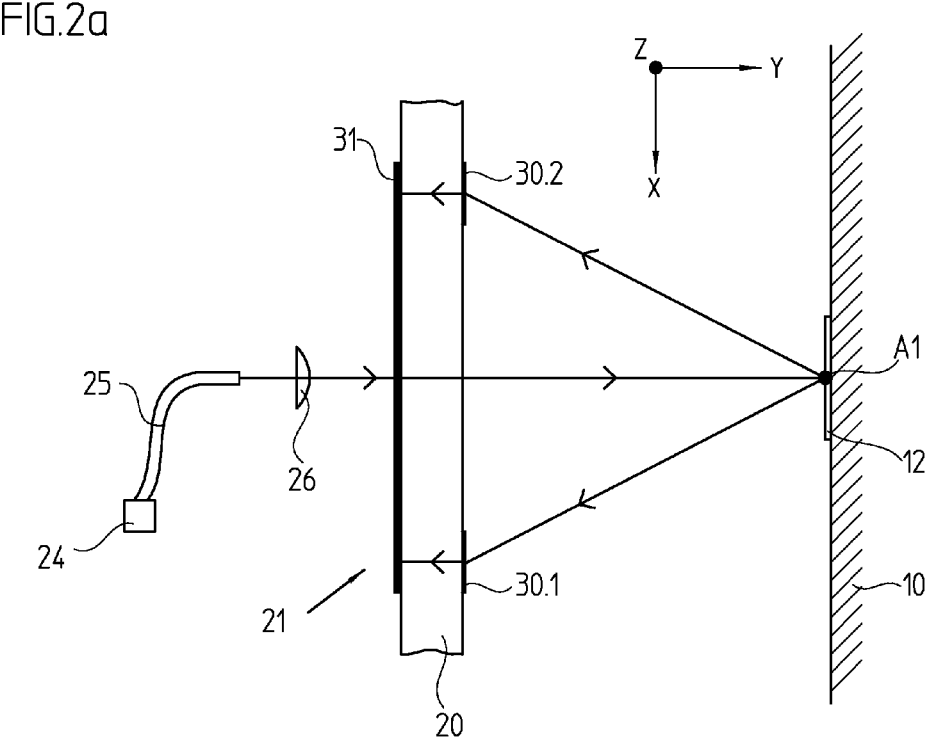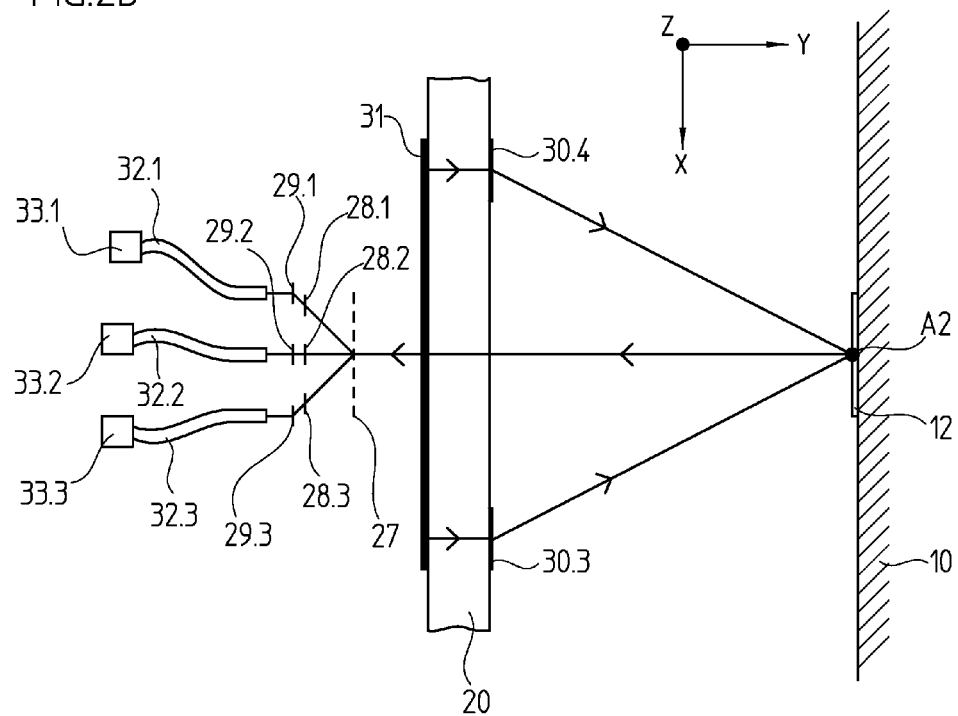

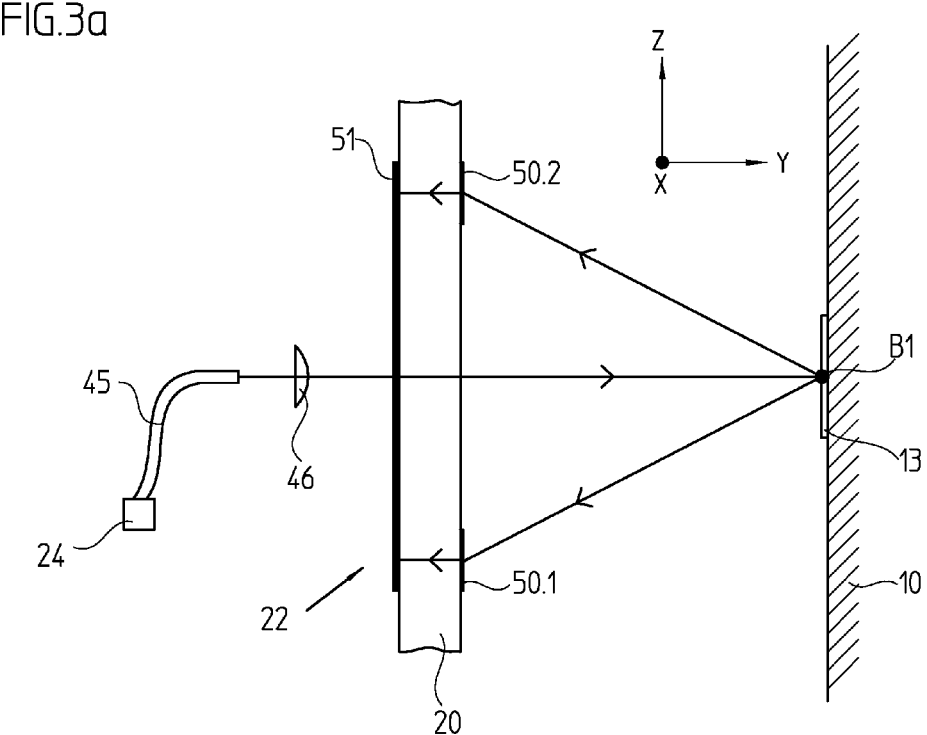
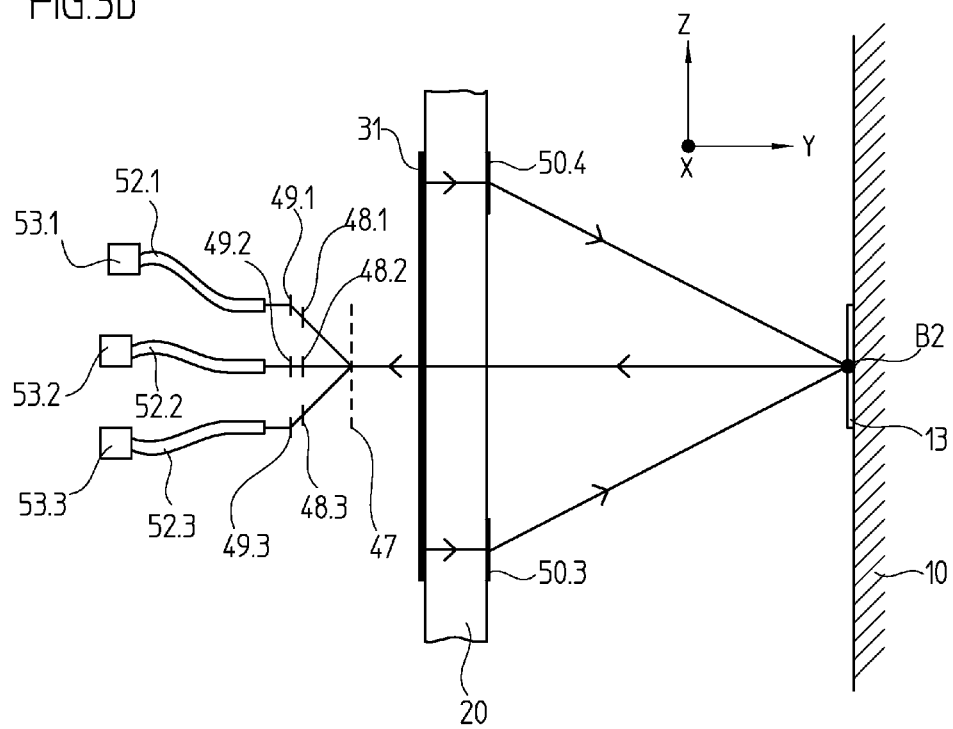

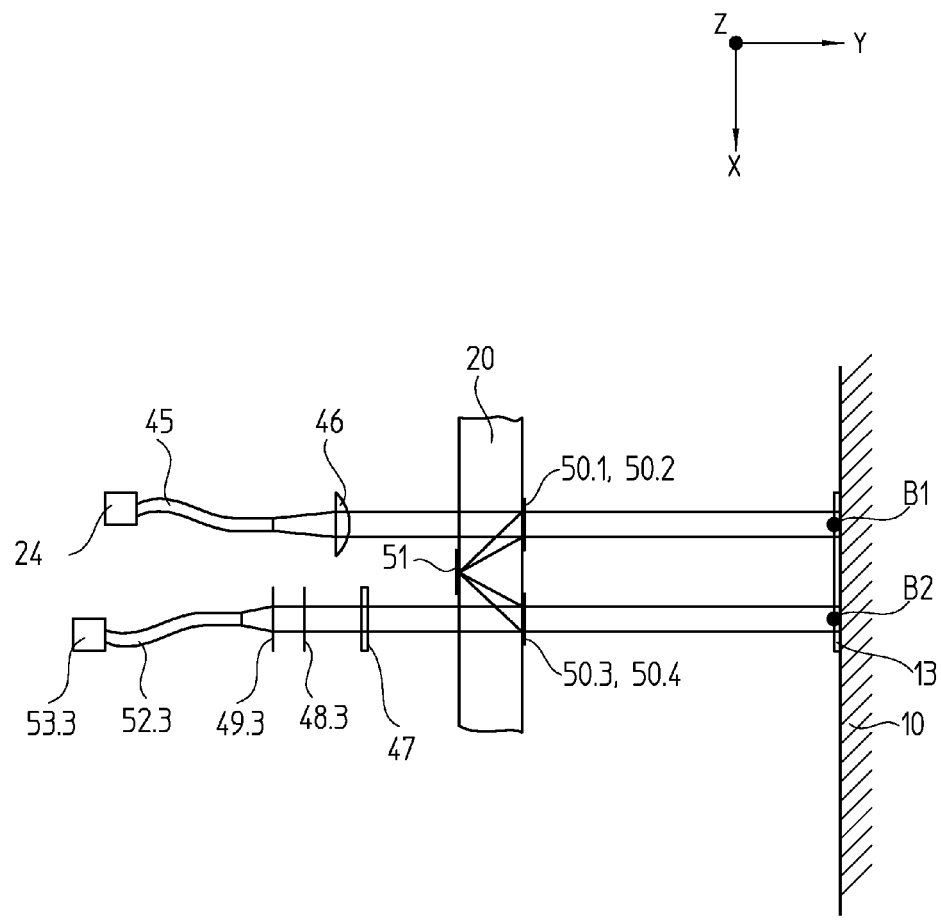

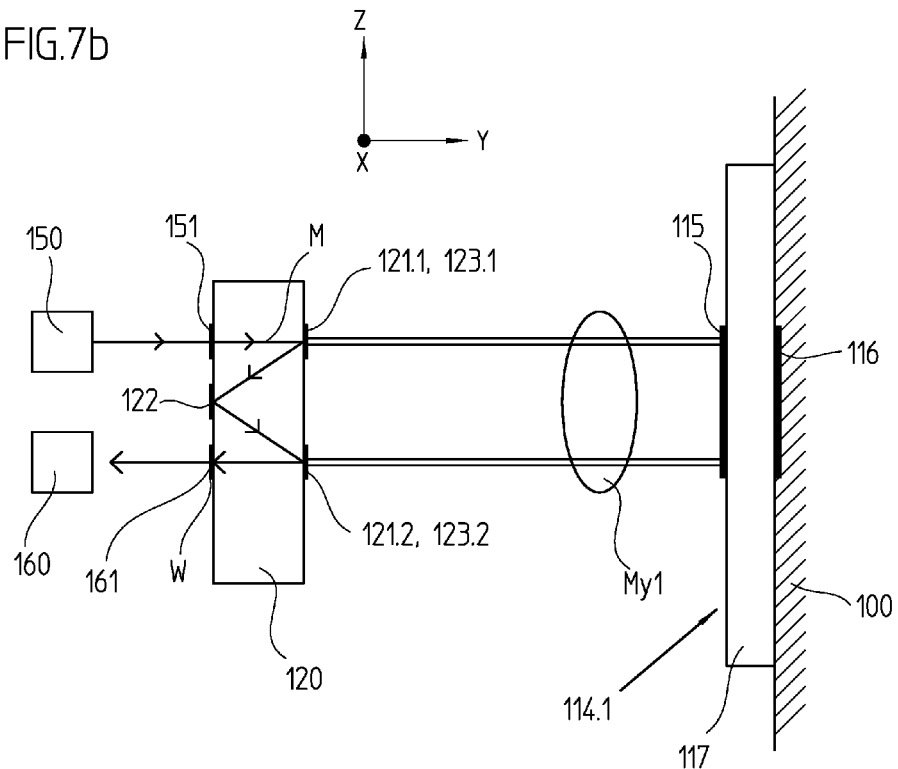
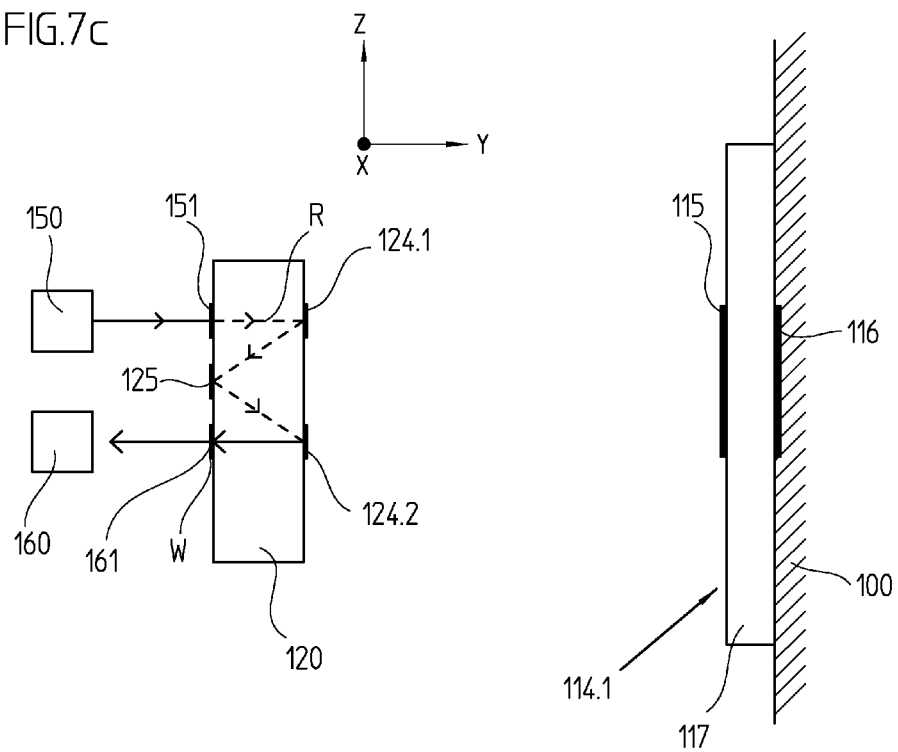

FIG.13
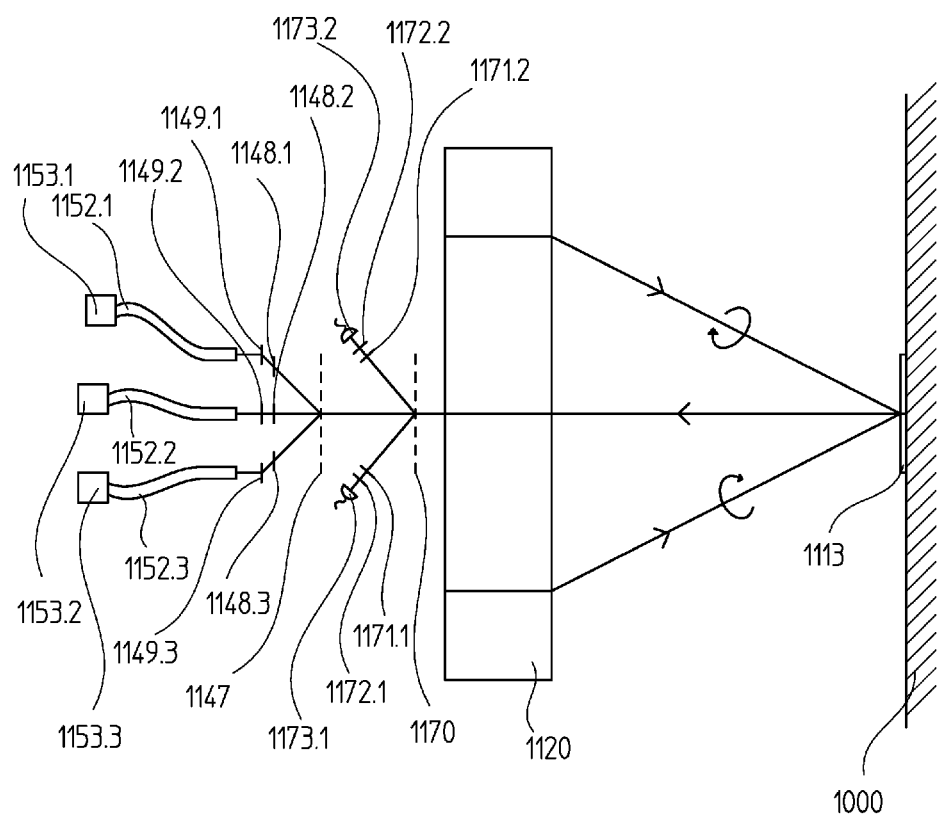
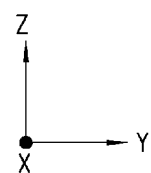

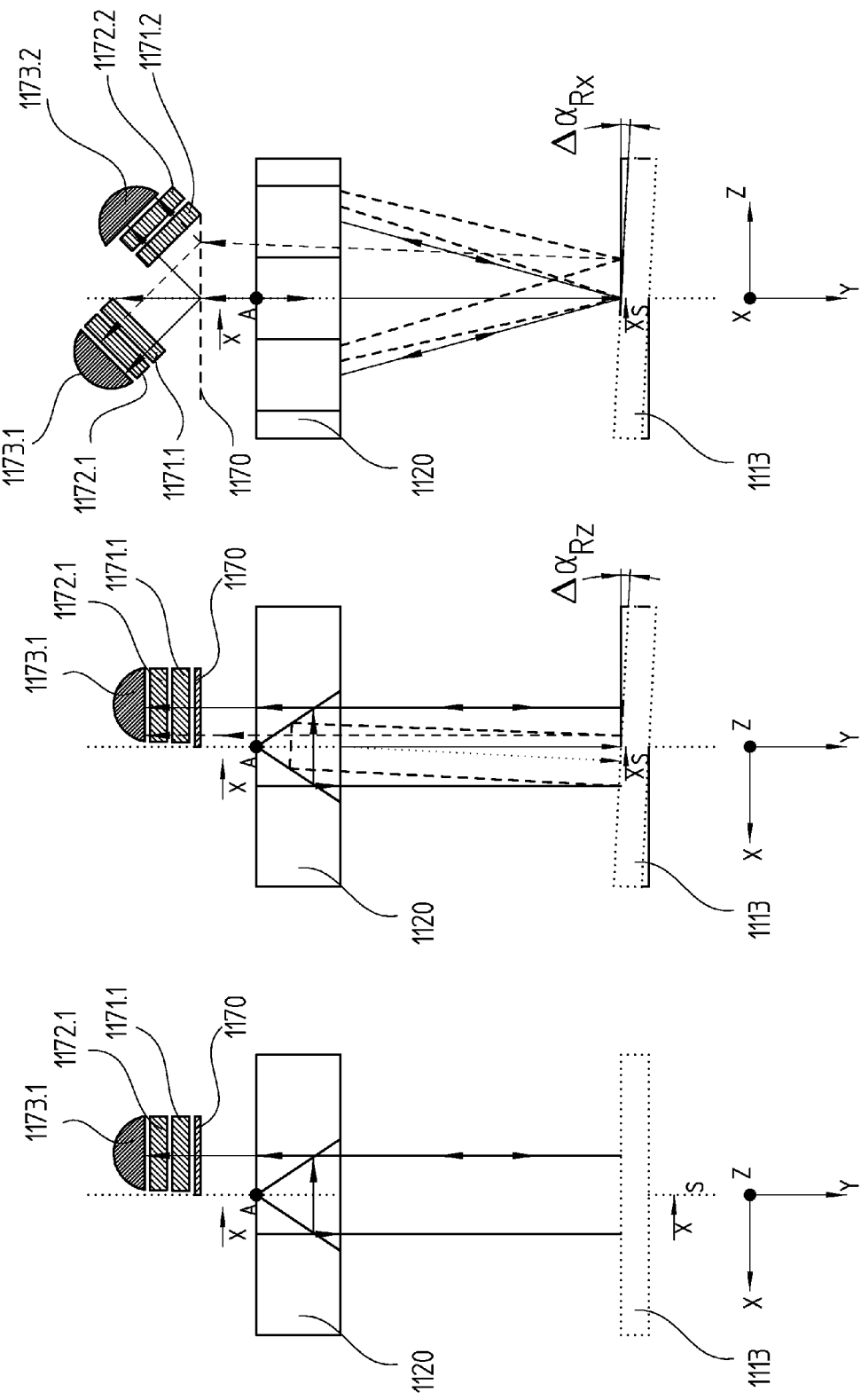

OPTICAL POSITION-MEASURING DEVICE

CROSS-REFERENCE TO RELATED APPLICATIONS

The present application claims priority to Application No. 10 2012 223 887.5, filed in the Federal Republic of Germany on Dec. 20, 2012, which is expressly incorporated herein in its entirety by reference thereto.

The present application also claims the benefit of Provisional Patent Application No. 61/739,883, filed on Dec. 20, 2012, which is expressly incorporated herein in its entirety by reference thereto.

FIELD OF THE INVENTION

The present invention relates to an optical position-measuring device for detecting the position of an object in several spatial degrees of freedom.

BACKGROUND INFORMATION

In machines which are used to manufacture and inspect semiconductor components, there is often the requirement to position objects precisely. For instance, it may be necessary for a wafer to be positioned extremely precisely under a tool of an exposure or inspection unit. In that case, the wafer lies on a table that is movable in six degrees of freedom and is moved via one or more suitable drives. Thus, the table acts as the object whose position must be detected extremely precisely. In order to position this table via an associated control unit, the generating of position signals with respect to the spatial position of the table by highly accurate position-measuring devices is necessary.

In particular, optical position-measuring devices such as interferometers, grating-based optical position-measuring devices or combinations of such devices are suitable for this purpose.

In order to accurately determine the spatial position of the object in several degrees of freedom using interferometers, U.S. Pat. No. 6,020,964, for example, describes probing the object optically from at least two sides. Disposed on two sides of the object or table are reflectors, upon which several measurement beams of associated interferometer measuring arms fall. What are termed multi-axis interferometers having several measurement beams or measuring arms are used per side, in order to also be able to detect rotational movements of the object about the various directions of movement. The at least two probing directions are usually oriented orthogonally relative to each other, so that the movement of the object is thus determinable in the plane which is defined by the two directions of movement. Possible movements of the object in a direction of movement perpendicular thereto may be detected via suitably diverted measurement beams which are reflected back again at reflectors above the object. To that end, suitable reflecting mirrors must be disposed on the object. A problem with this approach, however, is that the object must be probed optically via at least two sides. Consequently, these two sides must be as freely accessible as possible for the measurement beams. However, this cannot be ensured constructionally in all applications. In addition, the reflecting mirror on the object necessary for the diverting first of all increases the moving mass of the object, and secondly, can only be produced with considerable expenditure in the accuracy required.

German Published Patent Application No. 10 2012 201 393 describes detection of the position of an object in several spatial degrees of freedom, in which optical probing of the object is provided from only one direction. The limitations discussed above having several necessary probing directions are therefore inapplicable. However, a relatively complex offsetting of the position signals of various measurements is necessary in order to determine the movement of the object in the total of six degrees of freedom.

SUMMARY

Example embodiments of the present invention provide an optical position-measuring device for detecting the position of an object in at least two spatial degrees of freedom, which requires optical probing of the object from only one side. In this context, it is desired to ensure the most direct and simple measurement of the object position in at least two spatial degrees of freedom.

According to example embodiments of the present invention, the optical position-measuring device is used to detect the position of an object in several degrees of freedom, the object being disposed in a manner allowing it to move at least along a first direction of movement and along a second direction of movement. The position-measuring device includes at least one light source, at least one first measuring standard which is located on the object, extends along a first extension direction and has graduation regions disposed periodically along the first extension direction, as well as at least one second measuring standard which is located on the object, extends along a second extension direction and has graduation regions disposed periodically along the second extension direction. The position-measuring device further includes a scanning plate into which at least first and second retroreflector elements are integrated, the first retroreflector element extending parallel to the first extension direction and the second retroreflector element extending parallel to the second extension direction, and via which, sub-beams that fall on them from the first and second measuring standard, are reflected back again in the direction of the respective measuring standard. From superposed sub-beams, a detector system is able to generate position signals at least with respect to the movement of the object along the first and second directions of movement.

The retroreflector elements may take the form of diffractive retroreflector elements, in which (a) a plurality of diffractive elements are disposed on a first side of the scanning plate; and (b) at least one reflector element is disposed on the opposite second side of the scanning plate, whose reflective side is oriented in the direction of the diffractive elements, and the reflector element extending parallel to the first or second extension direction.

It may be provided that four diffractive elements per retroreflector element are disposed on a first side of the scanning plate, so that a pair of sub-beams incoming from a first point of incidence on the associated measuring standard initially passes through first and second diffractive elements and in each instance is thereby focused and deflected to the reflector element on the opposite second side of the scanning plate. At the reflector element, the two sub-beams are reflected back to a third and fourth diffractive element, via which the traversing sub-beams in each case are collimated and deflected in the direction of a second point of incidence on the associated measuring standard.

The diffractive elements may take the form of locally limited transmission gratings disposed on the first side of the scanning plate and having curved grating lines.

In addition, it is possible to integrate into the scanning plate a third retroreflector element, which extends parallel to the second extension direction and via which sub-beams that fall on it from the second measuring standard, are reflected back in the direction of the second measuring standard.

The first and second measuring standards may each be formed as reflection gratings, and the graduation regions of the first and second measuring standard may be oriented perpendicularly relative to each other.

In this connection, it may also be provided that the first and second measuring standard are superimposed with each other in the form of a cross grating.

The optical position-measuring device may include: at least one measuring reflector disposed on the object; at least one beam-splitter element, coupled mechanically to the scanning plate, in order to split a beam of rays falling on it into at least one measurement beam and at least one reference beam, so that at least one interferometer measuring arm is formed via the measurement beam propagating in the direction of the measuring reflectors, and an interferometer reference arm is formed via the reference beam; and an interferometer detector system, via which, from the superposed measurement beam and reference beam, position signals are able to be generated with regard to the movement of the object along a third direction of movement which is oriented perpendicularly to the first and second directions of movement.

The beam-splitter element, a plurality of diffractive elements, and at least one reflector element may be integrated into the scanning plate, so that between the splitting at the beam-splitter element and the superposition with the measurement beam, the reference beam propagates exclusively in the scanning plate.

Furthermore, the measuring reflector may include a diffractive element and a reflector element.

At least three measurement beams, disposed symmetrically relative to each other, may propagate in the direction of the at least one measuring reflector.

In addition, it is possible that a single light source is used at least for scanning the first and second measuring standards.

The first direction of movement may be oriented parallel to the first extension direction, and the second direction of movement may be oriented parallel to the second extension direction.

Via at least one splitting element, at least a portion of the sub-beams may be directed to a position-sensitive electro-optical detector element, and by detecting the point of incidence of the sub-beams falling on it, the position of the object may be determined in the case of a rotation about at least one direction of movement.

The first direction of movement may also form an angle of, for example, 45° with the first extension direction, and the second direction of movement may form an angle of 45° with the second extension direction.

Using the arrangements described herein, it is possible to detect an object position in at least two spatial degrees of freedom, the optical probing necessary for this purpose being carried out from only one direction. Thus, only one side of the object must be accessible for the required optical probing. Therefore, additional design possibilities result if the corresponding object is in the form of a table, for example, able to be positioned in two or more degrees of freedom, in a machine.

In comparison to the interferometer arrangement discussed above, the optical position-measuring device according to example embodiments of the present invention may also eliminate the need to place reflecting mirrors, which are heavy and costly to produce, on the object. It is sufficient to dispose at least two measuring standards having suitably formed graduations or gratings there. For example, if they are integrated as linear graduations in suitable form into a plane-parallel plate, they may be produced easily and cost-effectively. In addition, the mass of the moving object thereby increases only slightly.

The arrangements described herein result in a substantially two-part system, in which, besides the measuring standards on the object, only a scanning plate is provided as an optically functionally-relevant component. Optical fibers may be used for the light feed as well as for supplying the interferingly superposed sub-beams to a detector system, which means it is possible to position the light source and detector system to be spatially remote from the measuring standards and the scanning plate.

In particular, the integration of all optically relevant elements into the scanning plate permits the realization of a markedly compact system. In this connection, an overall system may be provided which includes a combination of grating-based optical position-measuring devices and one or more interferometric position-measuring devices.

Depending on the measuring demand, up to all six spatial degrees of freedom of an object may be measured directly metrologically with the required accuracy via the suitably arranged optical position-measuring device. It is not necessary to combine measurements along several directions of movement.

If, in some instances, extremely precise position measurement in all six spatial degrees of freedom should not be necessary in the particular application, then more simply constructed optical position-measuring devices may also be provided.

Further features and aspects of example embodiments of the present invention are described in more detail below with reference to the appended Figures.

BRIEF DESCRIPTION OF THE DRAWINGS

FIG. 2a schematically illustrates a partial scanning beam path of the optical position-measuring device between the light source and retroreflector element.

FIG. 2b schematically illustrates a partial scanning beam path of the optical position-measuring device between the retroreflector element and detector system.

FIG. 3a schematically illustrates a further partial scanning beam path of the optical position-measuring device between the light source and retroreflector element.

FIG. 3b schematically illustrates the further partial scanning beam path of the optical position-measuring device between the retroreflector element and detector system FIG. 3c schematically illustrates the scanning beam path for detecting the object movement along a second direction of movement.

FIGS. 7a to 7c illustrate an interferometer beam path additionally provided in the optical position-measuring device.

FIG. 13 schematically illustrates a partial scanning beam path of the optical position-measuring device.

FIGS. 14a to 14e illustrate the detection of rotational-movement degrees of freedom with the aid of the optical position-measuring.

DETAILED DESCRIPTION

Figure 1:
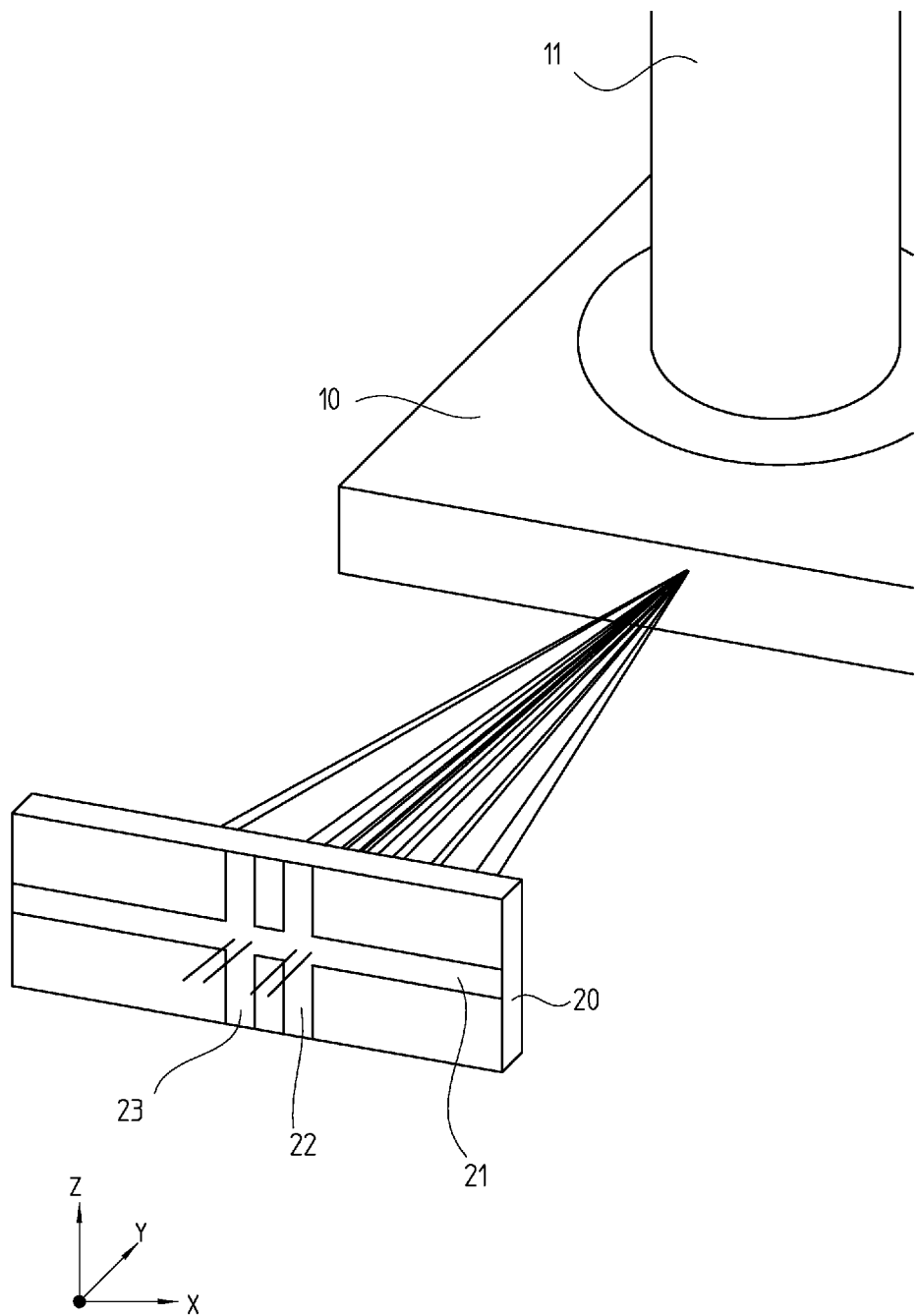
FIG. 1 is a schematic, partial, perspective of an optical position-measuring device according to an example embodiment of the present invention.

An optical position-measuring device according to an example embodiment of the present invention is explained with reference to FIGS. 1 to 5. The position-measuring device makes it possible to detect the position of an object 10 in several spatial degrees of freedom. FIG. 1 is a schematic perspective partial view of the position-measuring device, FIGS. 2a to 2c and 3a to 3c illustrate partial scanning beam paths, FIG. 4 is a top view of the measuring standards disposed on object 10, and FIG. 5 is a top view of one side of scanning plate 20.

The detection of the position of a movably disposed object 10 in three spatial degrees of freedom is possible with the aid of the optical position-measuring device. The optical position-measuring device relates to the detection of linear movements of object 10 along a first direction of movement x, along a second direction of movement z, and rotational movements of object 10 about a third direction of movement y. As illustrated in FIG. 1, in the exemplary embodiment shown, first and second directions of movement x and z of object 10 are oriented orthogonally relative to each other. In the present example embodiment, third direction of movement y of object 10 is oriented orthogonally to the two directions of movement x, z.

In the present example, a table, indicated schematically, of a semiconductor manufacturing machine acts as movable object 10. With the aid of drives, this table may be positioned in several spatial degrees of freedom relative to stationary machine components, e.g., a tool 11 indicated in FIG. 1. Position signals regarding the spatial position of the table are generated via the optical position-measuring device and made available to a control unit for further processing, especially for controlling the drives.

Figure 4:
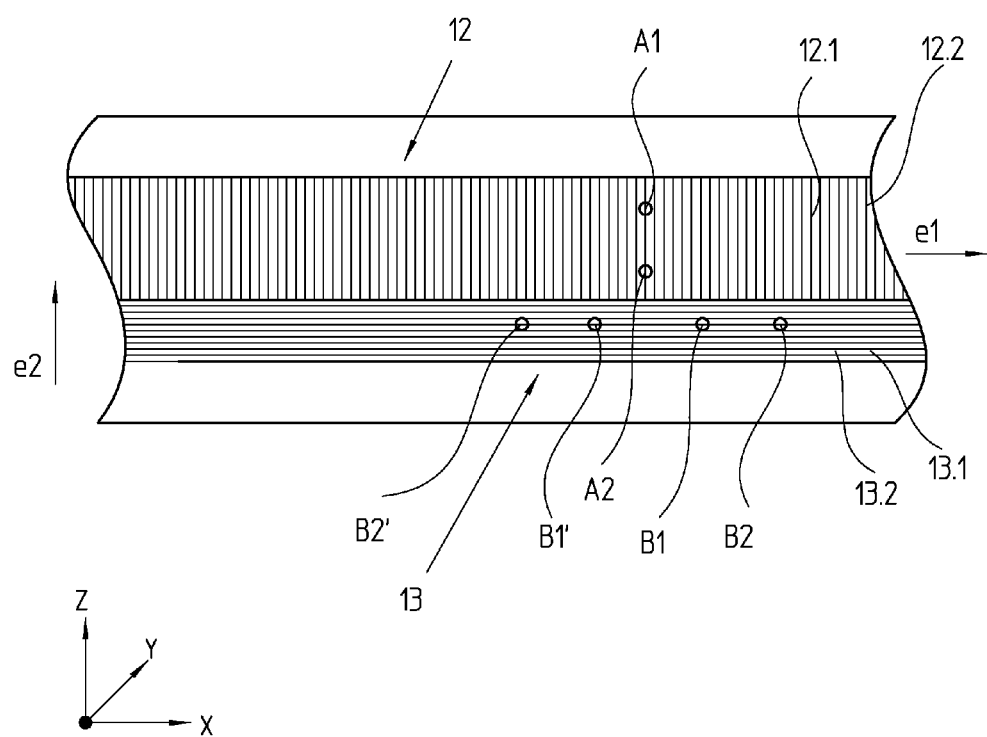
FIG. 4 is a top view of the measuring standards disposed on the object in the optical position-measuring device.
Figure 5:
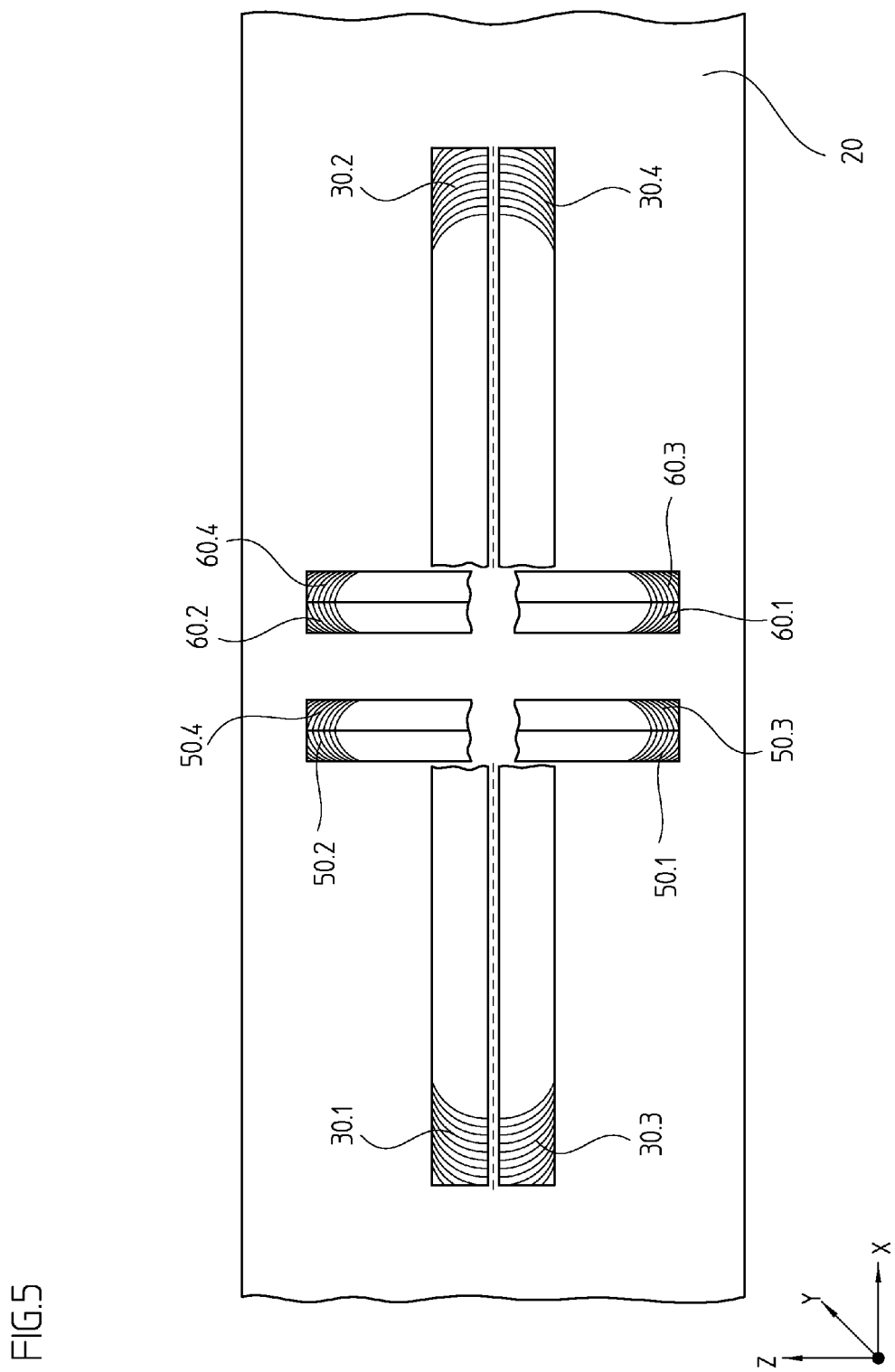
FIG. 5 is a top view of the side of the scanning plate facing the object in the optical position-measuring device.

First of all—as illustrated in FIG. 4—the optical position-measuring device includes two measuring standards 12, 13 situated on object 10. In the example illustrated, the two measuring standards 12, 13 are in the form of reflection gratings, e.g., reflection phase gratings or reflection amplitude gratings, and in each case include graduation regions 12.1, 12.2 and 13.1, 13.2, respectively, disposed periodically along a first extension direction e1 and along a second extension direction e2. Graduation regions 12.1, 12.2 and 13.1, 13.2 each exhibit different reflective properties on the beams of rays falling on them. In the present exemplary embodiment, extension directions e1 and e2 of the two measuring standards 12, 13 are oriented perpendicularly to each other. In addition, first extension direction e1 is oriented parallel to first direction of movement x, and second extension direction e2 is oriented parallel to second direction of movement z.

The optical position-measuring device additionally includes a scanning plate 20 made of glass, into which a plurality of retroreflector elements 21, 22, 23 are integrated. A total of three retroreflector elements 21 to 23 are provided in the exemplary embodiment illustrated. A first retroreflector element 21 extends parallel to first extension direction e1 of first measuring standard 12, and a second retroreflector element 22 extends parallel to second extension direction e2 of second measuring standard 13. In addition, in the present example, a third retroreflector element 23 is integrated into scanning plate 20 and, like second retroreflector element 22, extends parallel to second extension direction e2 in scanning plate 20. In each case, the various retroreflector elements 21, 22, 23 reflect the sub-beams, which fall on them from first and second measuring standards 12, 13, back in the direction of respective measuring standards 12, 13. Reference is made to the subsequent description of FIGS. 2a to 2c and 3a to 3c with regard to the detailed scanning beam paths.

The optical position-measuring device also has a light source and a detector system. Position signals at least with regard to the object movement along first and second directions of motion x, z are able to be generated via the detector system from the superposed sub-beams.

Figure 2C:
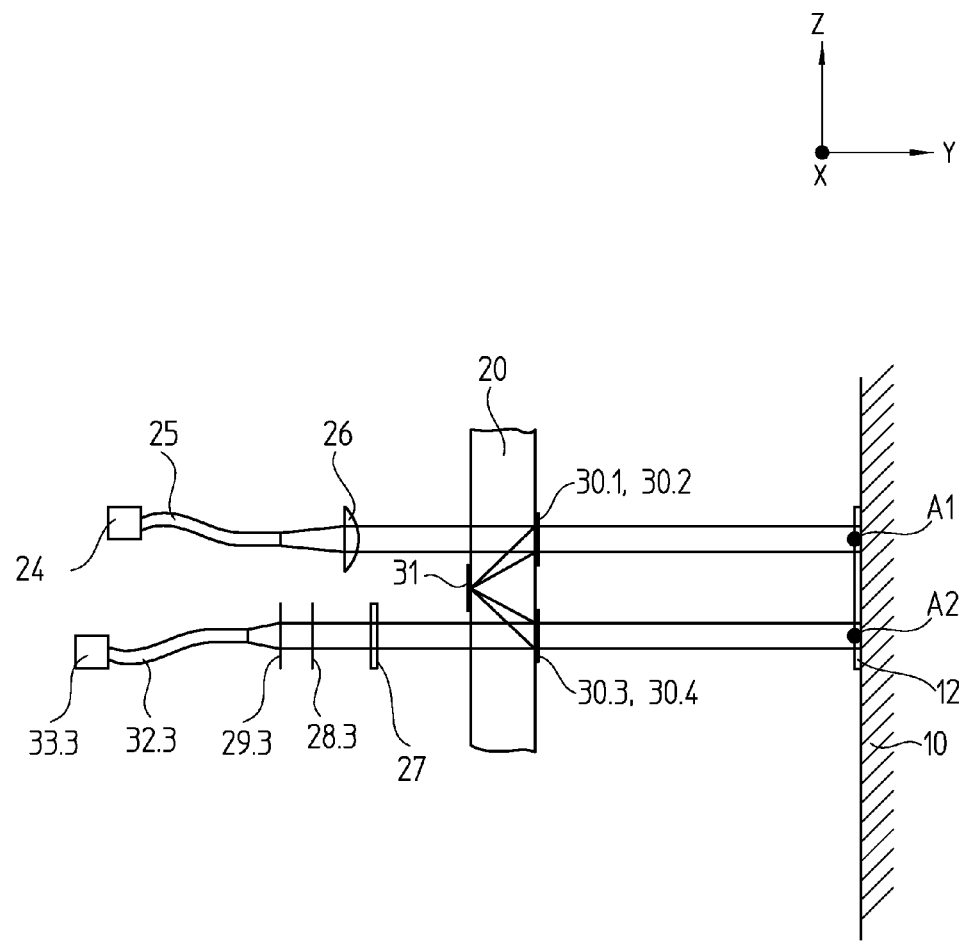
FIG. 2c schematically illustrates the scanning beam path for detecting the object movement along a first direction of movement in the optical position-measuring device.

The scanning beam path in the optical position-measuring device illustrated, via which displacement-dependent position signals with respect to the object movement along first direction of movement x are able to be generated, is explained with reference to FIGS. 2a to 2c. To that end, first of all, the beam of rays emitted by a light source 24 is coupled into an optical fiber 25. For example, many different lasers, such as semiconductor lasers, gas lasers, external cavity lasers, fiber lasers, etc., may be provided as light source 24. Downstream of the end of optical fiber 25 on the coupling-out side is a collimating optical system 26, via which the beam of rays leaving optical fiber 25 is collimated. The collimated beam subsequently passes through an optically non-effective area of scanning plate 20, e.g., a bore hole or a transparent area, and impinges a first time at a first point of incidence A1 on first measuring standard 12 on object 10. As illustrated in FIG. 2a, at first measuring standard 12, the incident team is split in the xy-plane into two sub-beams which are reflected back in this plane in the direction of scanning plate 20.

On the part of scanning plate 20, first retroreflector element 21 integrated into it reflects the sub-beams back in the direction of a second point of incidence A2 on first measuring standard 12. According to FIG. 2c and FIG. 4, second point of incidence A2 is located along the z-direction, set apart from first point of incidence A1.

First retroreflector element 21 in scanning plate 20, like the other retroreflector elements 22, 23, as well, takes the form of a diffractive retroreflector element and includes a plurality of diffractive elements 30.1 to 30.4. as well as at least one reflector element 31. In this case, diffractive elements 30.1 to 30.4 are disposed on a first side of scanning plate 20 which is oriented in the direction of first measuring standard 12. In the present exemplary embodiment, diffractive elements 30.1 to 30.4 are arranged as locally limited transmission gratings having curved grating lines. Rectangular reflector element 31, extending parallel to first extension direction e1, is located on the opposite second side of scanning plate 20, its reflective side being oriented in the direction of diffractive elements 30.1 to 30.4.

As illustrated in FIG. 2a, the sub-beams incoming from first point of incidence A1 on first measuring standard 12 initially pass through first and second diffractive elements 30.1, 30.2 of first retroreflector element 21 in scanning plate 20. In so doing, via the suitably dimensioned gratings, they first of all are deflected along second extension direction e2, and secondly, are focused onto reflector element 31 along first extension direction e1. For instance, reference is also made to the view of the scanning beam path in FIG. 2c with regard to these optical effects of diffractive elements 30.1, 30.2. At reflector element 31, the sub-beams are reflected back and then, as illustrated in FIG. 2b, pass through third and fourth diffractive elements 30.3, 30.4 on the first side of scanning plate 20. Via third and fourth diffractive elements 30.3, 30.4, the traversing sub-beams are each collimated and deflected in the direction of a second point of incidence A2 on first measuring standard 12. At second point of incidence A2, the two split sub-beams are recombined and, after reflection at first measuring standard 12, propagate superposed in the direction of scanning plate 20. In scanning plate 20, the superposed sub-beams pass through an optically non-effective area, e.g., a suitably placed borehole or a transparent area, and thereupon arrive at a splitting grating 27, where a split takes place into three spatial directions. Incidentally, as an alternative to the arrangement illustrated, splitting grating 27 could also be integrated into the second side of scanning plate 20. In each instance, polarization filters 28.1 to 28.3 and lenses 29.1 to 29.3 are then disposed in the three spatial directions. Via lenses 29.1 to 29.3, the superposed sub-beam pairs are coupled into optical fibers 32.1 to 32.3 and supplied to detector elements 33.1 to 33.3 of a detector system. With the aid of detector elements 33.1 to 33.3, in the case of the relative movement between first measuring standard 12, i.e., object 10, and scanning plate 20 along first direction of movement x, phase-shifted position signals are able to be acquired which may be subsequently processed in, e.g., a conventional manner by a control unit. Accordingly, in the corresponding machine, first measuring standard 12 is disposed on movable object 10, that is, on the movable table. Scanning plate 20 is disposed on a machine component which, in contrast, is stationary.

In addition to this, the optical position-measuring device illustrated permits detection of the object movement along second direction of movement z. FIGS. 3a to 3C illustrate the scanning beam path, via which position signals regarding the object movement along second direction of movement z are able to be generated. It corresponds substantially to the scanning beam path previously described for detecting the object movement along first direction of movement x, however, is rotated by 90° about the y-direction relative to it.

Light source 24 used for the scanning beam path described above is also used to scan second measuring standard 13, and the beam of rays emitted by it is coupled into a further optical fiber 45. Thus, in the present exemplary embodiment, a single light source is used at least for scanning first and second measuring standards 12, 13. A beam splitter necessary for splitting the beam of rays supplied by light source 24 into the various scanning beam paths is provided in this connection. Conventional beam splitters such as beam splitter cubes, beam splitter plates, fiber splitters, gratings, etc., may be provided for this purpose. Downstream of the end of optical fiber 45 on the coupling-out side is again a collimating optical system 46, via which the beam of rays leaving optical fiber 45 is collimated. The collimated beam subsequently passes through a further optically non-effective area of scanning plate 20 and impinges a first time on second measuring standard 13 at a first point of incidence B1. According to FIG. 3a, because of the orientation of graduation regions 13.1, 13.2 of second measuring standard 13, the incident beam is split at second measuring standard 13 into two sub-beams in the yz-plane, which are then reflected back in this plane in the direction of scanning plate 20. Because of the orientation of graduation regions 13.1 13.2 of the second measuring standard as well as extension direction e2 of second measuring standard 13, the splitting plane of this scanning beam path is therefore perpendicular to the splitting plane of the scanning beam path illustrated in FIGS. 2a to 2c.

On the part of scanning plate 20, the sub-beams are reflected via second retroreflector element 22 integrated therein, back in the direction of a second point of incidence B2 on second measuring standard 13, the second point of incidence according to FIG. 3c and FIG. 4, respectively, being along the x-direction, set apart from first point of incidence B1. Second retroreflector element 22 in scanning plate 20 is likewise implemented as a diffractive retroreflector element and includes a plurality of diffractive elements 50.1 to 50.4, as well as at least one reflector element 51. Diffractive elements 50.1 to 50.4 are disposed on the first side of scanning plate 20 and take the form of locally limited transmission gratings having curved grating lines. Rectangular reflector element 51, extending parallel to second extension direction e2, is located on the opposite second side of scanning plate 20.

As illustrated in FIG. 3a, the sub-beams incoming from first point of incidence B1 on second measuring standard 13 initially pass through first and second diffractive elements 50.1, 50.2 of second retroreflector element 22 in scanning plate 20. In so doing, they first of all are deflected, and secondly, are focused onto reflector element 51. In this regard, reference is also made to the view of the scanning beam path illustrated in FIG. 3c. At reflector element 51, the sub-beams are reflected back and then, as illustrated in FIG. 3b, pass through third and fourth diffractive elements 50.3, 50.4 on the first side of scanning plate 20. Via third and fourth diffractive elements 50.3, 50.4, the traversing sub-beams are each collimated and deflected in the direction of second point of incidence B2 on second measuring standard 13. The two split sub-beams are recombined at second point of incidence B2, and after being reflected, propagate superposed in the direction of scanning plate 20. In scanning plate 20, the superposed sub-beams pass through a further optically non-effective area and thereupon arrive at a further splitting grating 47, where a split into three spatial directions takes place. Like above, in each case polarization filters 48.1 to 48.3 and lenses 49.1 to 49.3 are disposed in the three spatial directions. The superposed sub-beam pairs are coupled via lenses 49.1 to 49.3 into optical fibers 52.1 to 52.3 and supplied to remotely disposed detector elements 53.1 to 53.3 of a detector system. In the case of the relative movement between second measuring standard 13 and scanning plate 20 along second direction of movement z, phase-shifted position signals are able to be acquired with the aid of detector elements 53.1 to 53.3, which are able to be processed subsequently by the downstream control unit.

Thus, via the two scanning beam paths described, the position of object 10 in the case of displacements along first direction of movement x and along second direction of movement z may be determined extremely precisely using the optical position-measuring device. Thus, in principle, two spatial degrees of freedom of object 10 are already ascertainable metrologically.

In position-measuring device, a further second scanning beam path is provided for detecting the movement along second direction of movement z. To that end, a third retroreflector element 23 is integrated in scanning plate 20, third retroreflector element 23, like second retroreflector element 22, extending parallel to second extension direction e2 which, in the present exemplary embodiment, coincides with second direction of movement z. Third retroreflector element 23 reflects the sub-beams, falling on it from second measuring standard 13, back in the direction of the second measuring standard. Like both first and second retroreflector elements 21, 22, third retroreflector element 23 is in the form of a diffractive retroreflector element having a plurality of diffractive elements 60.1 to 60.4 and at least one reflector element. The second scanning beam path for detecting the object movement along second direction of movement z corresponds in general to the scanning beam path explained above with reference to FIGS. 3a to 3c. Therefore, a detailed description thereof is not repeated. In FIG. 5, diffractive elements 60.1 to 60.4 of third retroreflector element 23 are illustrated on the first side of scanning plate 20. First and second points of incidence B1', B2' of the sub-beams of the associated scanning beam path on second measuring standard 13 are illustrated in FIG. 4.

By offsetting the position signals of the two scanning beam paths for detecting the movement along second direction of movement z, a possible rotational movement of object 10 about third direction of movement y may be determined in, e.g., conventional manner. In this manner, a third spatial degree of freedom of object 10 may thus be ascertained metrologically. In this connection, the optical probing of movable object 10 provided for ascertaining all three degrees of freedom is carried out from a single direction that coincides with third direction of movement y of object 10.

As set forth in the preceding description, the optically functional components of the position-measuring device may be integrated into scanning plate 20, especially retroreflector elements 21, 22, 23 necessary for the optical scanning. In the exemplary embodiment described above, the various diffractive elements 30.1 to 30.4, 50.1 to 50.4, 60.1 to 60.4 in the form of suitably constructed transmission gratings are disposed on the first side of scanning plate 20 which is facing measuring standards 12, 13. Respective associated reflector elements 31, 51 are disposed on the second side opposite to it.

FIG. 5 is a top view of the first side of scanning plate 20 utilized, having the various diffractive elements 30.1 to 30.4, 50.1 to 50.4, 60.1 to 60.4 of the three retroreflector elements 21, 22, 23 provided. Besides diffractive elements 30.1 to 30.4 and 50.1 to 50.4 of first and second retroreflector elements 21, 22 from the two scanning beam paths explained above, four further diffractive elements 60.1 to 60.4 are illustrated, which belong to third retroreflector element 23 that is provided for detecting position along second direction of movement z. The four diffractive elements 60.1 to 60.4 of third retroreflector element 23 are identical to the four diffractive elements 50.1 to 50.4 of second retroreflector element 22, offset in the x-direction in the xz plane according to FIG. 5.

The monolithic construction of scanning plate 20 having the optically functional components of the respective scanning integrated into it therefore eliminates the need for a costly alignment of individual optical components when assembling the optical position-measuring device. With respect to object 10, it is only necessary to dispose linear measuring standards 12, 13. As illustrated, the three spatial degrees of freedom of movable object 10 may be ascertained by optically probing it from a single direction.

The position-measuring device may be modified and adapted to the specific measuring demands and circumstances.

For example, as an alternative to the placement of measuring standards 12, 13 on object 10 illustrated in FIG. 4, it is also possible to divide first measuring standard 12 into two identically formed partial measuring standards having the same orientation of the graduation regions, and to place these two partial measuring standards above and below second measuring standard 13 on the object. In the case of such a placement, the centers of area of points of incidence A1, A2 B1, B2 and B1', B2', respectively, of all three optical probings for ascertaining the three degrees of freedom of movement of object 10 are located on a line parallel to first direction of movement x. Thus, the effective measuring points are also located on this line, and a simple transformation rule results in a coordinate system appropriate for the application. Furthermore, such a placement of the individual measuring standards exhibits a mirror symmetry which is advantageous in terms of drift and torsional sensitivity of the system.

While in the exemplary embodiment described, in each case the beams of rays are supplied by the remotely disposed light source to the scanning plate via optical fibers, the light source used may also be disposed directly adjacent to the scanning plate, that is, no optical fibers would then be necessary. Analogously, the optical fibers on the detection side could also be omitted if the detector elements are placed directly adjacent to the scanning plate. Furthermore, variants are also possible in which the beams of rays are supplied by the light source via optical fibers and the detector elements are disposed directly adjacent to the scanning plate. Conversely, the light source may also be placed directly adjacent to the scanning plate and the beams of rays on the detection side may be supplied to the detector elements via optical fibers.

The optical position-measuring device, via which three degrees of freedom of the movable object are ascertainable metrologically, may also be modified in various manners in terms of the number of spatial degrees of freedom of the movable object to be ascertained. Modifications with regard to lower demands in the case of the accuracy of the position determination are possible, as well.

If, for example, it is only necessary to ascertain two spatial degrees of freedom, that is, for example, only the metrological detection of linear movements of the object along first and second directions of movement x and z, the above-mentioned second scanning for detecting the object movement along second direction of movement z may be omitted. In this case, third retroreflector 23 would then no longer be necessary in scanning plate 20.

It is further possible to ascertain all six spatial degrees of freedom of the object with extreme precision via additional measures, e.g., to use the measures to ascertain the remaining three degrees of freedom of movement. A suitable exemplary embodiment of the optical position-measuring device is described below with reference to FIGS. 6, 7a to 7c, and 8 to 10. In addition, a modification is able to be realized to the effect that it is also possible to detect position in six spatial degrees of freedom, in doing so, individual degrees of freedom of movement only being ascertained with reduced accuracy. To that end, an exemplary embodiment is explained below with reference to FIGS. 11 to 15. In each case, all these variants of the optical position-measuring device the required optical probing of the movable object is from only one direction.

Figure 6:
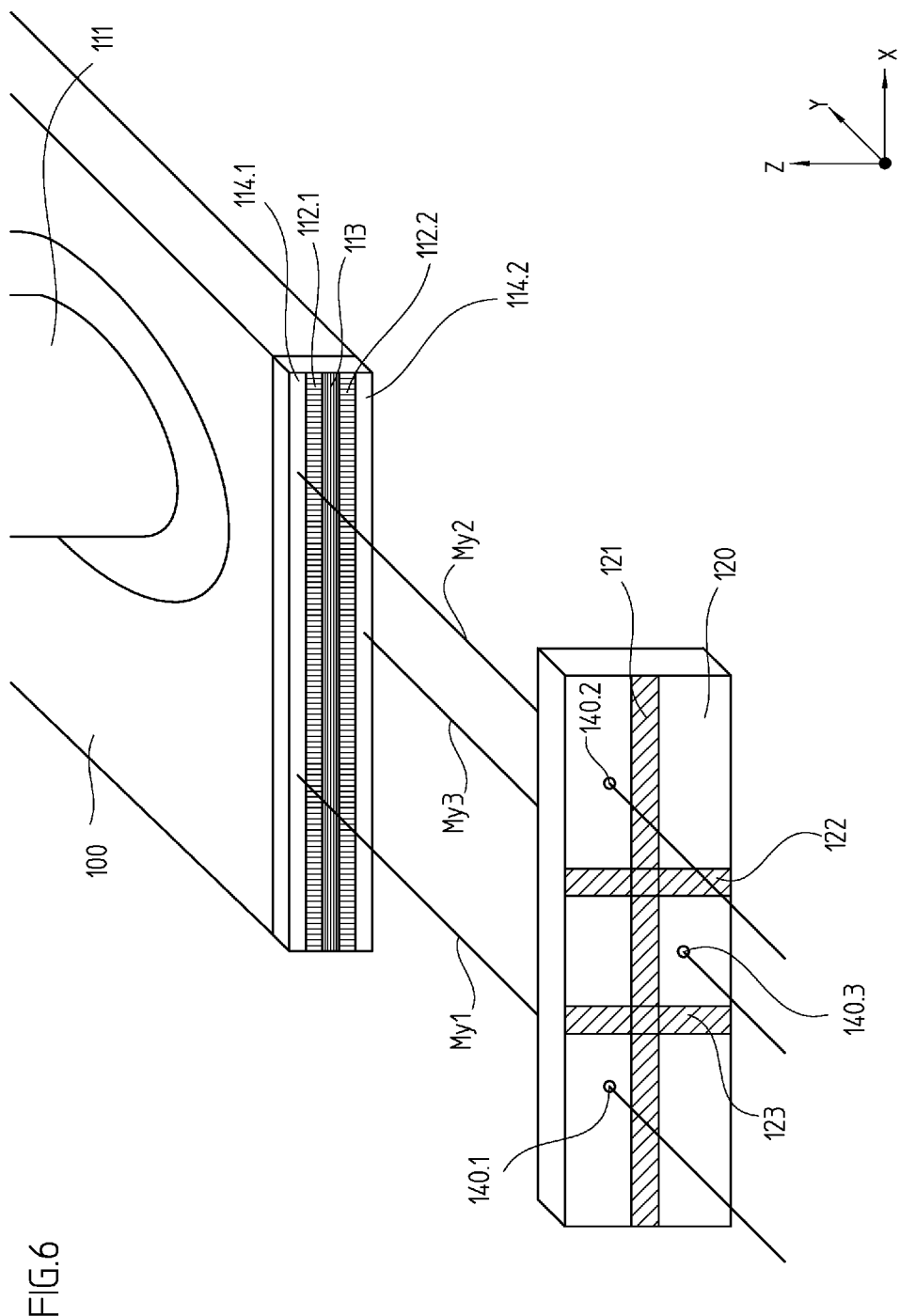
FIG. 6 is a schematic perspective view of an optical position-measuring device according to an example embodiment of the present invention.

FIG. 6 is a schematic perspective partial view of an optical position-measuring device. Scanning plate 120 used, as well as measuring standards 112.1, 112.2, 113 and measuring reflectors 114.1, 114.2 disposed on object 100 are illustrated. Basically, the detection of the linear object movements along first direction of movement x and along second direction of movement z, as well is the detection of the rotational movement about third direction of movement y are carried out identically as in the exemplary embodiment described above. The three retroreflector elements 121, 122, 123 necessary for this purpose are indicated schematically in scanning plate 120. The first measuring standard, divided into two identical partial measuring standards 112.1, 112.2, as well as second measuring standard 113 are disposed on the side of object 100, first and second partial measuring standards 112.1, 112.2 being disposed above and below second measuring standard 113. For reasons of clarity, the associated scanning beam paths for scanning the various measuring standards 112.1, 112.2, 113 are not shown in FIG. 6.

To ascertain the three further degrees of freedom, i.e., the linear object movement along third direction of movement y as well as the rotational movements of object 100 about first and second directions of movement x, z, additionally three interferometer measuring arms My1, My2, My3, illustrated schematically, are provided, via which object 100 is probed optically from the same direction as for ascertaining the other three degrees of freedom. The associated three interferometer axes penetrate scanning plate 120 at locations 140.1, 140.2 and 140.3 and strike object 100 on measuring reflectors 114.1, 114.2, which in each case are disposed in the xz plane above and below partial measuring standards 112.1, 112.2. Further details concerning the interferometer beam paths are not shown in FIG. 6. Reference is made in this regard to the subsequent description of FIGS. 7a to 7c and 8 to 10 to possible arrangements of suitable interferometers.

It is additionally possible to ascertain the three remaining spatial degrees of freedom metrologically via the three interferometer measuring arms My1, My2, My3. Thus, for example, the object movement along third direction of movement y may be determined from the measurements of a first interferometer measuring arm My1. The rotational movements of object 100 about first direction of movement x and about second direction of movement z may be ascertained in, e.g., conventional manner based on suitable combinations of the measurements of two respective interferometer measuring arms My2, My3. In this regard, reference is made, for example, to U.S. Pat. No. 6,020,964, mentioned above, which is expressly incorporated herein in its entirety by reference thereto.

In this connection, it is considered to be advantageous if, as illustrated in FIG. 6, at least three symmetrically disposed measurement beams propagate in the direction of the at least one measuring reflector 114.1, 114.2, e.g., if at least three symmetrically disposed interferometer measuring arms My1, My2, My3 are provided. While in the exemplary embodiment illustrated, a centrosymmetric placement of the three interferometer measuring arms My1, My2, My3 is provided, in the case of four interferometer measuring arms, for example, a symmetrical placement would be able to be provided such that the four interferometer measuring arms in cross-section define a square, etc.

With reference to FIGS. 7a to 7c and 8 to 10, it is explained in the following how such an interferometer measuring arm My1, which is integrated into a position-measuring device illustrated in FIG. 6, may be formed. The two further interferometer measuring arms My2, My3, etc., provided may be formed analogously to that, as well.

Figure 7A:
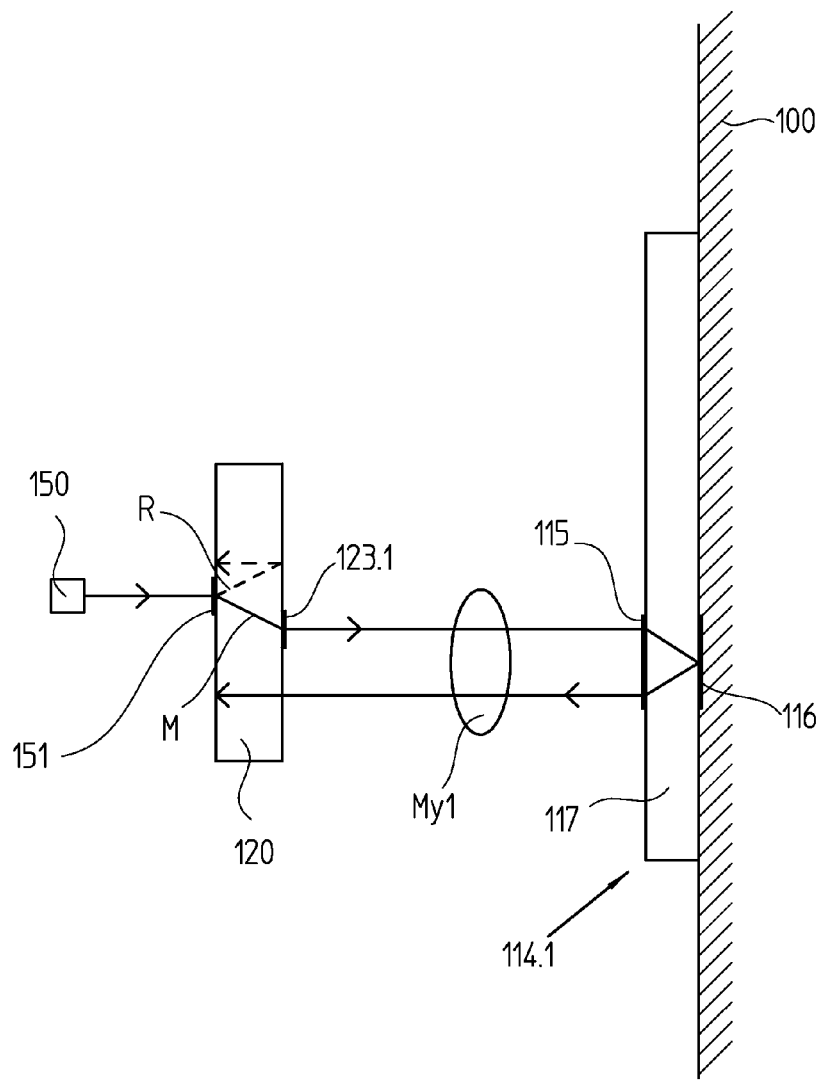
Figure 8:
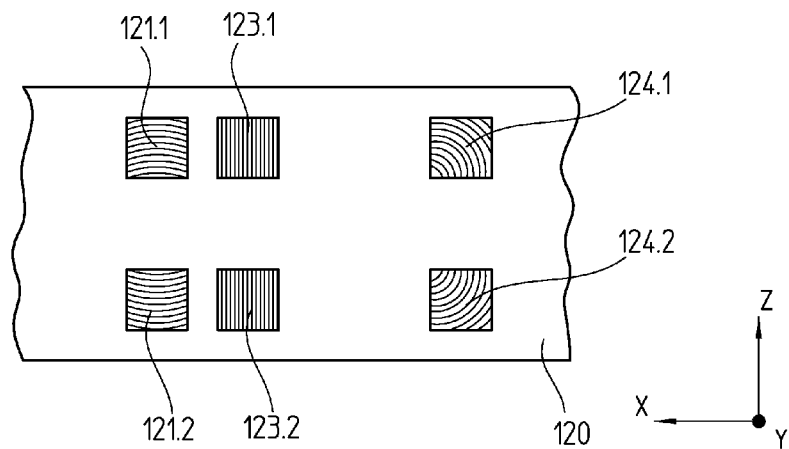
FIG. 8 is a top view of the side of the scanning plate facing the measuring reflector and having the elements provided for the additional interferometer beam path.
Figure 9:
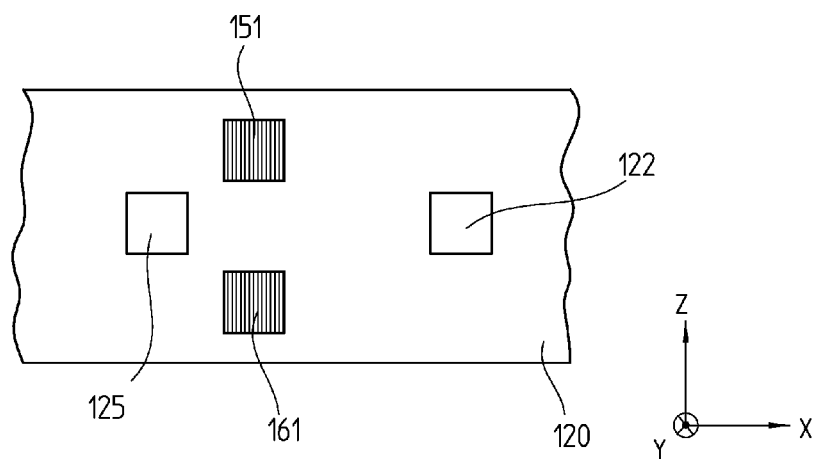
FIG. 9 is a top view of the side of the scanning plate facing away from the measuring reflector and having the elements provided for the additional interferometer beam path.
Figure 10:
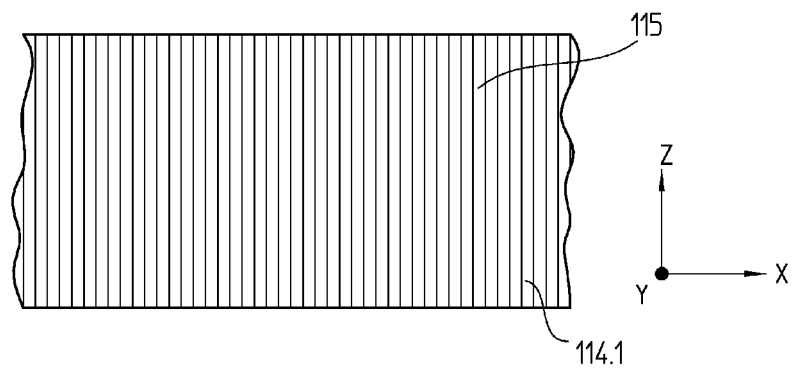
FIG. 10 is a top view of the side, facing the scanning plate, of the measuring reflector used in the interferometer beam path.

FIG. 7a shows the interferometer beam path in the xy plane, FIG. 7b shows the beam path in the interferometer measuring arm in the yz plane, and FIG. 7c shows the beam path in the interferometer reference arm in the yz plane. The placement of the various optically functionally-relevant elements for forming interferometer measuring arm My1 is particularly clear in FIGS. 8 to 10. FIG. 8 is a top view of the part of the first side of scanning plate 120 relevant in this connection, FIG. 9 is a top view of the opposite second side of scanning plate 120, and FIG. 10 is a top view of the part of measuring reflector 114.1 acted upon by interferometer measuring arm My1.

A beam of rays generated by a light source 150 strikes a beam-splitter element 151, via which the incident beam is split into a measurement beam M and a reference beam R. In the present exemplary embodiment, a separate light source 150 is provided for the interferometer measuring arms. In this manner, suitably optimized light sources may be selected for the interferometer position measurements and the grating-based position measurements. In principle, however, the use of one common light source for the various optical position-measuring principles utilized would also be possible.

After the splitting, measurement and reference beams M, R then propagate in interferometer measuring arm My1 and in the interferometer reference arm, respectively. In FIG. 7a, measurement beam M is represented by continuous lines, and reference beam R is represented by dashed lines.

In the exemplary embodiment shown, a transmission grating acts as beam-splitter element 151, which is disposed on the second side of scanning plate 120 that is assigned to light source 150. As illustrated in FIG. 9, the longitudinal axis of the graduation regions of this transmission grating is oriented parallel to second direction of movement z. The extension direction of this transmission grating is oriented parallel to the first direction of movement.

After the splitting and deflection in the xy plane have occurred, the measurement beam propagates in the direction of the first side of scanning plate 120, passes through a first diverting element 123.1 there in the form of a transmission grating, is aligned by it parallel to the y-direction and propagates a first time in the direction of measuring reflector 114.1 located on object 100. Measuring reflector 114.1 in the present exemplary embodiment is in the form of a diffractive measuring reflector and includes a diffractive element 115, formed as a transmission grating, as well as a reflector element 116. As illustrated in FIG. 7a, diffractive element 115 and reflector element 116 are provided on the front and back side of a glass plate 117. In this case, the front side of glass plate 117 is oriented in the direction of scanning plate 120.

As illustrated in FIG. 7a, upon passing through diffractive element 115, measurement beam M falling on it perpendicularly is deflected in the xy-plane and propagates in the direction of reflector 116. There, it is reflected back in the xy-plane in the direction of diffractive element 115. After the second passage through diffractive element 115 and the deflection in the xy-plane thereby taking place again, measurement beam M propagates in the x-direction in parallel misalignment with respect to incident measurement beam M, back in the direction of scanning plate 120. There, measurement beam M strikes a measurement-beam retroreflector element that likewise is in the form of a diffractive retroreflector element and includes two diffractive elements 121.1, 121.2 on the first side of scanning plate 120 as well as a reflector element 122 on the second side of scanning plate 120. Diffractive elements 121.1, 121.2 are arranged as locally limited transmission gratings having curved grating lines, as illustrated in FIG. 8, for example. A plane reflector, whose reflective side is oriented in the direction of the first side of scanning plate 120, acts as reflector element 122. Measurement beam M initially strikes first diffractive element 121.1 of the measurement-beam retroreflector element, via which, according to FIG. 7b, it is deflected in the yz-plane downward in the direction of reflector element 122 located on the second side of scanning plate 120. After being reflected back by reflector element 122 in the direction of the first side of scanning plate 120, measurement beam M passes through second diffractive element 121.2 of the measurement-beam retroreflector element, and is thereby deflected again, so that it propagates a second time in the direction of measuring reflector 114.1. In so doing, this time the measurement beam propagates offset downward in the z-direction, parallel to third direction of movement y, to measuring reflector 114.1, as illustrated in FIG. 7b. At measuring reflector 114.1, measurement beam M passes through diffractive element 115 once more, is deflected by it in the direction of reflector element 116, from there is reflected back in the direction of diffractive element 115, and upon passing through it, is again deflected such that it propagates parallel to third direction of movement y, however offset in the x-direction compared to the incident measurement beam, back to scanning plate 120. On the first side of scanning plate 120, measurement beam M strikes second diverting element 123.2, again in the form of a transmission grating, and is diverted by it in the xy-plane in the direction of location W on the second side of scanning plate 120, where it is recombined with reference beam R at a recombination grating 161. As illustrated in FIG. 9, recombination grating 161 is integrated into the second side of scanning plate 120.

The detailed beam path of reference beam R in the interferometer reference arm is explained below with reference to FIGS. 7a and 7c. After the splitting at beam-splitter element 151 and the deflection in the xy-plane resulting in the process, reference beam R propagates in the direction of a reference-beam retroreflector element. The reference-beam retroreflector element is also diffractive and includes two diffractive elements 124.1, 124.2 on the first side of scanning plate 120, as well as a reflector element 125 on the second side of the scanning plate. However, reflection gratings, whose optically effective or reflective sides are oriented in the direction of the second side of scanning plate 120, act as diffractive elements 124.1, 124.2. As in the diffractive retroreflector elements, a plane reflector is used as reflector element 125, whose reflective side is oriented in the direction of the first side of scanning plate 120.

Reference beam R initially strikes first diffractive element 124.1 of the reference-beam retroreflector element, and is reflected and deflected by it in the direction of reflector element 125. Reference beam R is reflected by the reflector element in the direction of second diffractive element 124.2, and from there, is reflected and diverted in the direction of location W on recombination grating 161.

Thus, in the exemplary embodiment illustrated, between the splitting at splitting element 151 and the recombining or superposition with measurement beam M at location W, reference beam R propagates exclusively in scanning plate 120.

Recombined measurement and reference beams M, R arrive subsequently at interferometer detector system 160, indicated schematically in FIGS. 7b and 7c. From superposed measurement and reference beams M, R, the detection system is able in, e.g., conventional manner to generate position signals with respect to the object movement along third direction of movement y.

The beam paths in the two further interferometer measuring arms My2, My3 of the optical position-measuring device also proceed analogously to the beam path in interferometer measuring arm My1 explained above.

Certain modifications may be to the optical position-measuring device.

Thus, for example, an alternative beam-path guidance may be provided for the measurement and reference beams. In this context, it is also possible not to form the beam-splitter element as an integral component of the scanning plate, but rather to use a beam-splitter element which is spatially separate from it and is coupled with suitable mechanical rigidity to the scanning plate. In this case, conventional plane-mirror interferometers may be used, which include plane mirrors as measuring reflectors.

In addition, more than three interferometer measuring arms may also be provided, which are guided through the scanning plate in the direction of measuring reflectors on the object. Such additional interferometer measuring arms may be used for the self-calibration of the device, for example.

The optical position-measuring device described above permits the highly precise detection of the object movement in all six spatial degrees of freedom. They are the three degrees of freedom of linear movement with respect to the object movement along the three directions of movement x, z and y, as well as the three degrees of freedom of rotational movement with respect to the object rotation about the three directions of movement x, z and y. In certain applications, it may be sufficient if only the degrees of freedom of linear movement are detected with extreme precision. However, a lower precision in determining position may sometimes be adequate with regard to the degrees of freedom of rotational movement. A suitable variant of the optical position-measuring device is described below with reference to FIGS. 11 to 14e. A slightly modified variant is illustrated in FIG. 15.

Figure 11:
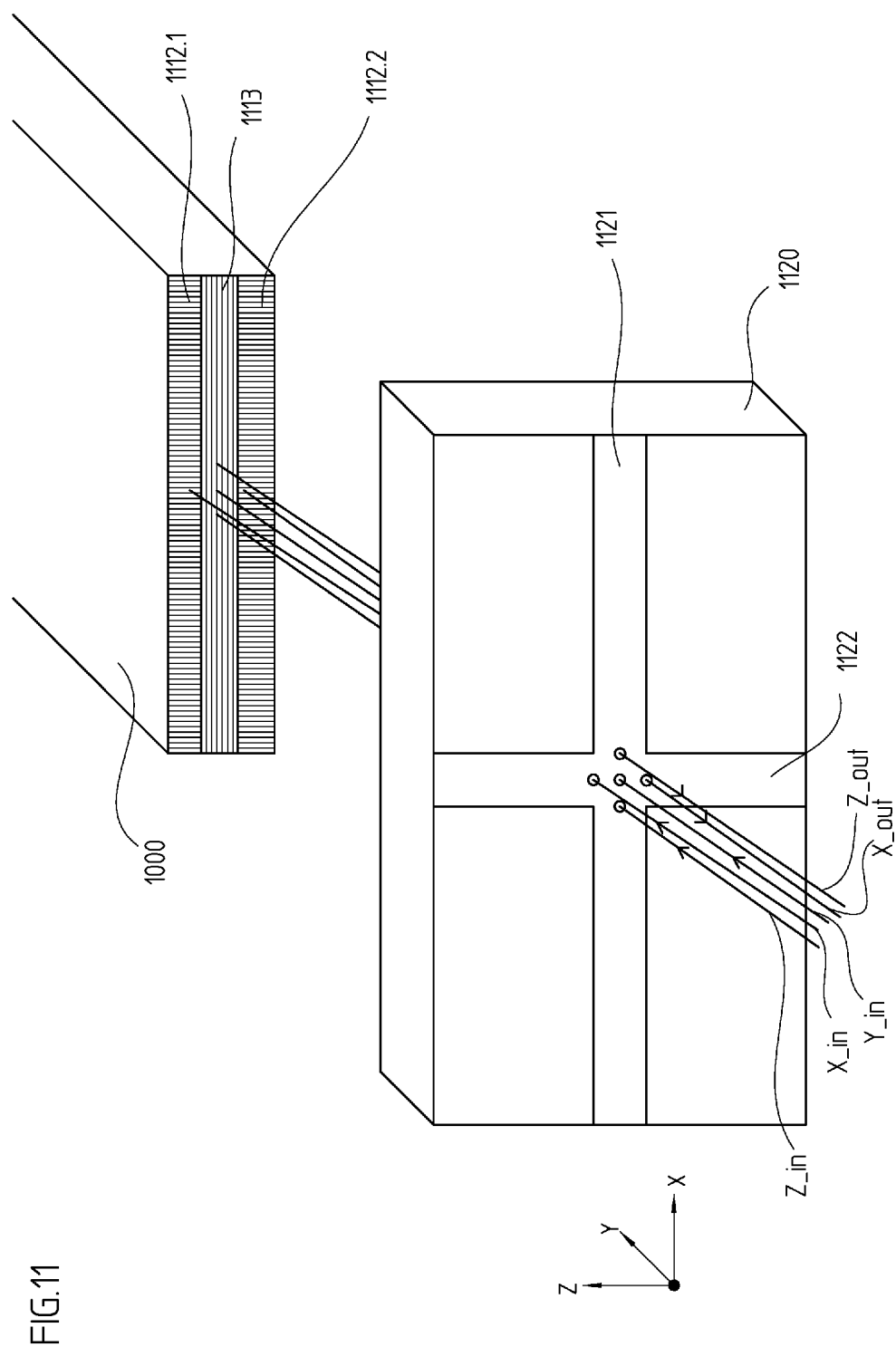
FIG. 11 is a schematic perspective view of an optical position-measuring device according to an example embodiment of the present invention.
Figure 12:
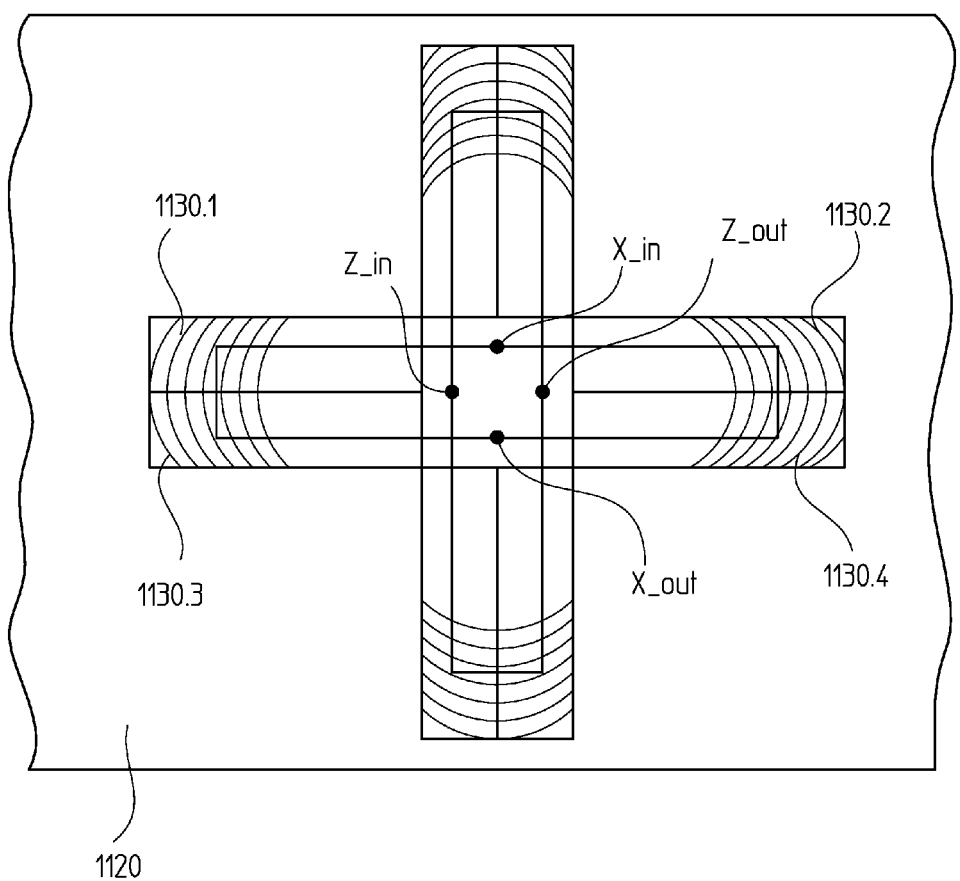
FIG. 12 is a top view of the side of the scanning plate facing the measuring standards in the optical position-measuring device.

FIG. 11 is a schematic perspective view of an optical position-measuring device, FIG. 12 is a top view of the first side of scanning plate 1120 utilized, and FIG. 13 illustrates a partial scanning beam path. FIGS. 14a to 14e illustrate various scanning beam paths in the case of the object rotation about the various directions of movement.

As illustrated in FIG. 11, only a first retroreflector element 1121 and a second retroreflector element 1122 orthogonal to it are integrated into scanning plate 1120 of the optical position-measuring device. Analogous to the exemplary embodiment described above, first retroreflector element 1121 extends parallel to first extension direction e1 of the two partial measuring standards 1112.1, 1112.2 on movable object 1000, first extension direction e1 again being oriented parallel to first direction of movement x. Likewise, second retroreflector element 1122 extends parallel to second extension direction e2 of second measuring standard 1113, second extension direction e2 likewise again being oriented parallel to second direction of movement z. The linear object movements along first and second directions of movement x. z are detected as described above. Therefore, a description of the associated optical scanning beam paths is not repeated. As illustrated in FIG. 11, as also in FIG. 12, the beams of rays falling on scanning plate 1120 for detecting the object movement along first and second directions of movement x, z are denoted by x_in and z_in, respectively. The superposed pair of sub-beams of the associated scanning beam paths are denoted by x_out and z_out. To detect the linear movement along third direction of movement y, as in the exemplary embodiment described above, an interferometer is provided, from which only a beam of rays y_in falling on scanning plate 1120 is illustrated in FIG. 11. The associated beam path may be selected as explained above.

Thus, there remains the detection of the three rotational degrees of freedom in the case of a possible rotation of object 1000 about orthogonal directions of movement x, z and y. This detection is accomplished by coupling out sub-beams onto position-sensitive detector elements 1173.1, 1173.2 from the beam path having the sub-beams propagating in the direction of the detector system after the recombination. FIG. 13 illustrates the partial beam path corresponding to FIG. 3b, which is used to detect the object movement along second direction of movement z. In this beam path, sub-beams for detecting the rotational degrees of freedom about directions of movement x, z and y are coupled out between the second side of scanning plate 1120 and splitting grating 1147. To that end, a splitting element 1170 in the form of a further splitting grating is disposed in the beam path of the superposed sub-beams and splits the beams falling on it into three spatial directions. Like in the above-described exemplary embodiment, the sub-beams transiting undeflected in the zeroth order of diffraction are used to detect the linear object movement along second direction of movement z. To that end, as explained above, they strike further splitting grating 1147 downstream, where a split takes place into three spatial directions. In each instance, polarization filters 1148.1 to 1148.3 and lenses 1149.1 to 1149.3 are again disposed in the three spatial directions. Via lenses 1149.1 to 1149.3, the superposed sub-beam pairs are coupled into optical fibers 1152.1 to 1152.3 and supplied to remotely disposed detector elements 1153.1 to 1153.3 of a detector system. As above, in the case of the relative movement along second direction of movement z, phase-shifted position signals are able to be acquired with the aid of detector elements 1153.1 to 1153.3.

The sub-beams diffracted into the +1st and −1st order of diffraction at splitting element 1170 are directed via lambda/4 plates 1171.1, 1171.2 and polarizers 1172.1, 1172.2 to position-sensitive detector elements 1173.1, 1173.2. In the case of a rotation of object 1000 about one of directions of movement x, z or y, the points of incidence of the sub-beams shift in defined manner on position-sensitive detector elements 1173.1, 1173.2. The specific object rotation about corresponding direction of movement x, z or y may be ascertained metrologically by detecting the position of the points of incidence of the split-off sub-beams on position-sensitive detector elements 1173.1, 1173.2. To that end, position-sensitive detector elements 1173.1, 1173.2 must detect the points of incidence of the sub-beams separately in both lateral directions. What are referred to as PSDs (Position Sensitive Devices) or else quadrant diodes may be used as position-sensitive detector elements 1173.1, 1173.2.

Figure 14E:
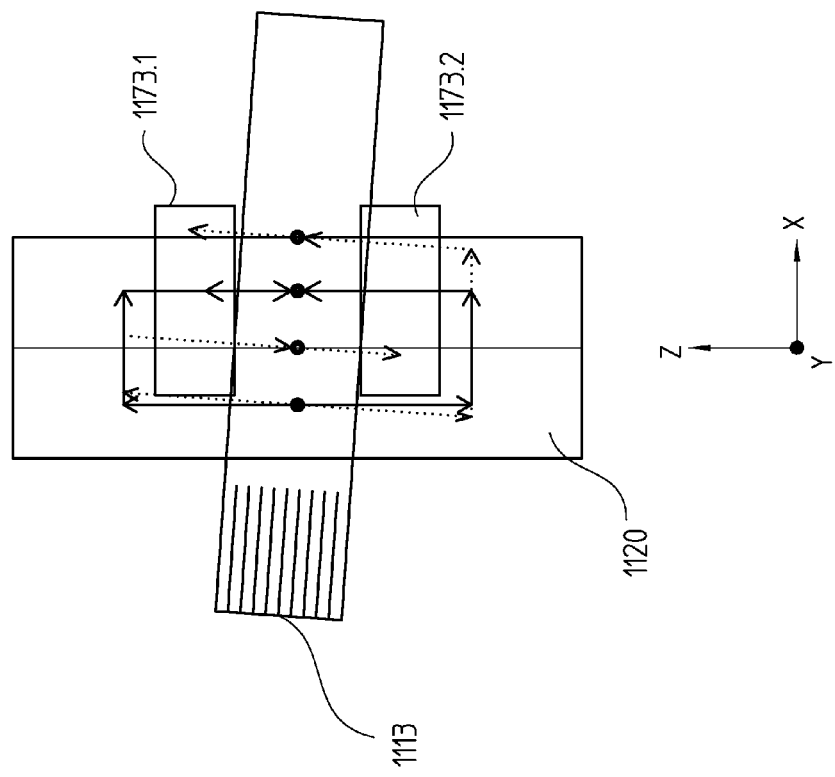

This detection of the rotational degrees of freedom is explained again in detail with reference to FIGS. 14a to 14e. FIG. 14a illustrates the scanning beam path for detecting the movement along second direction of movement z analogously to the illustration included in FIG. 3c, however, supplemented by a portion of the components necessary for detecting the various rotational movements. They are splitting element 1170, lambda/4 plate 1171.1, polarizer 1172.1 and position-sensitive detector element 1173.1. While the untitled nominal position of the object or of measuring standard 1113 is illustrated in FIG. 14a, in FIGS. 14b and 14c, the specific state is indicated when the object or second measuring standard 1113 is tilted about second direction of movement z (FIG. 14b) or about first direction of movement x (FIG. 14c). In each case, the scanning beam path in the untitled state is indicated in with a solid line in FIGS. 14b and 14c, the scanning beam path in the tilted state with a dashed line. While, as illustrated, in the untitled nominal position, in each instance the sub-beams fall centrally on position-sensitive detector elements 1173.1, 1173.2, in the case of a tilting about second direction of movement z, the point of incidence on position-sensitive detector elements 1173.1, 1173.2 shifts along first direction of movement x to the left or to the right (FIG. 14b). In the case of tilting about first direction of movement x, a shift of the point of incidence on position-sensitive detector elements 1173.1, 1173.2 results along second direction of movement z (FIG. 14c). In this example embodiment of the position-measuring device, the degree of tilting about respective axis of movement z or x may be determined metrologically by ascertaining the specific amount of such a shift of the point of incidence.

As mentioned above, lambda/4 plates 1171.1, 1171.2 and polarizers 1172.1, 1172.2, which are traversed by the various sub-beams, are placed in front of respective position-sensitive detector elements 1173.1, 1173.2. Via these elements, from the already interfering sub-beams, the original sub-beams prior to the superposition are filtered out, which are then supplied in defined manner to an associated position-sensitive detector element 1173.1, 1173.2.

Figure 14D:
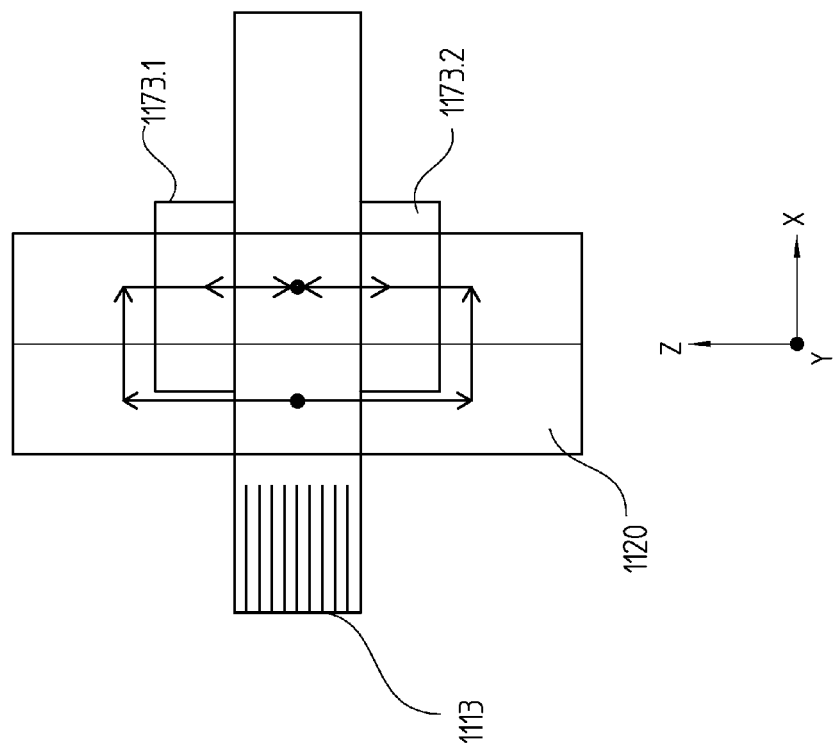
Figure 15:
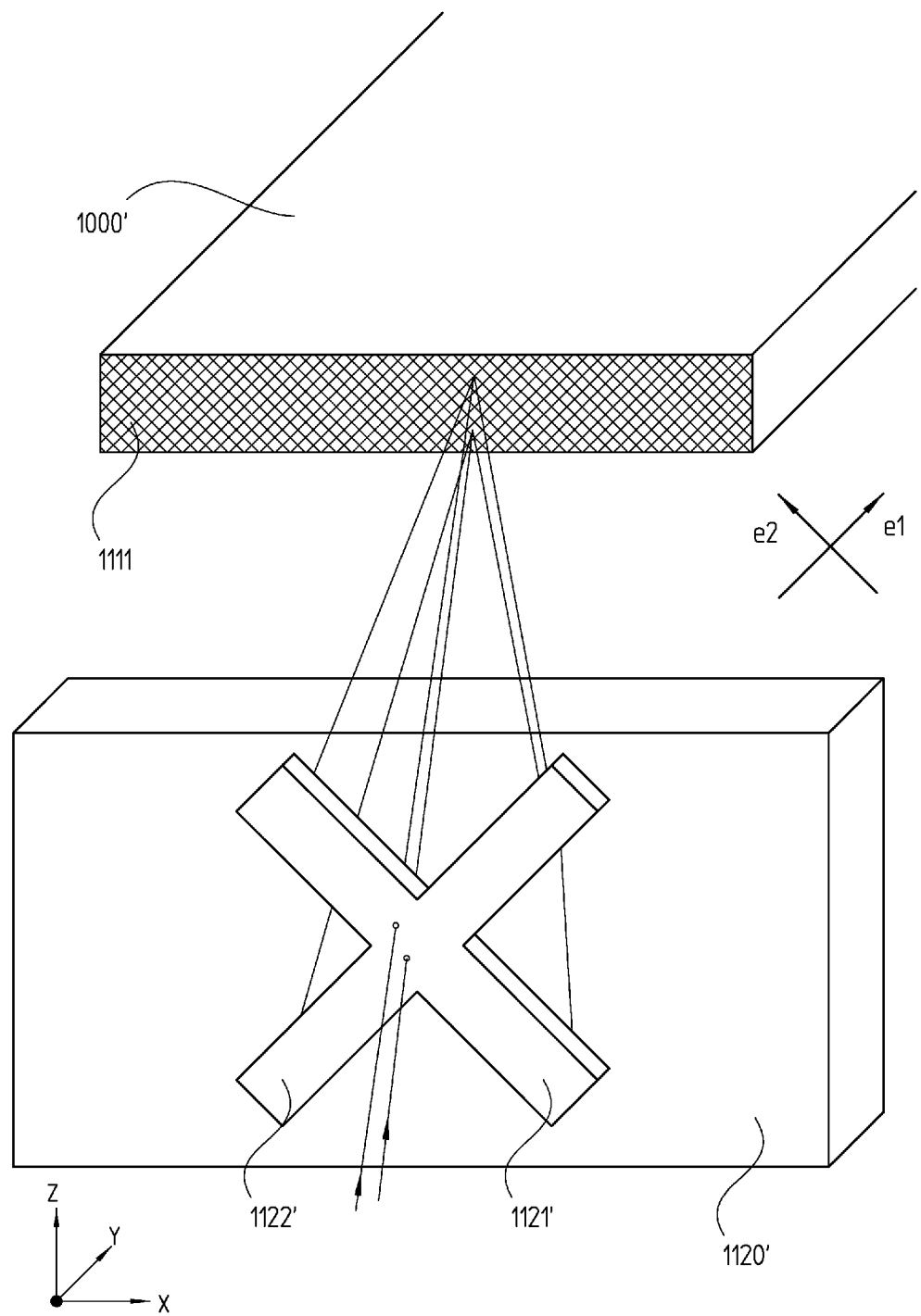
FIG. 15 schematically illustrates an optical position-measuring device according to an example embodiment of the present invention.

FIGS. 14d and 14e illustrate how the possible object rotation about third direction of movement y may be ascertained metrologically using this example embodiment of the position-measuring device. While FIG. 14d again shows the scanning beam path in the xz-plane in the untitled state, in FIG. 14e, additionally the scanning beam path is indicated with a dotted line when an object rotation results about third direction of movement y. As illustrated in FIG. 14e, in this case, an opposite shift of the two sub-beams, and therefore the points of incidence on position-sensitive detector elements 1173.1, 1173.2 results.

As an alternative to the variant shown with the coupling-out to position-sensitive detector elements 1173.1, 1173.2 after the recombining, it may also be provided to couple out portions from the sub-beams to position-sensitive detector elements prior to the recombining, and from the resulting shift of the points of incidence in the case of rotational movements of the object, to ascertain them metrologically.

A further variant of the optical position-measuring device is illustrated in FIG. 15. As illustrated, two mutually orthogonal retroreflector elements 1121', 1122' are again integrated into scanning plate 1120', however, compared to the previous exemplary embodiment, rotated by 45° about third direction of movement y. A two-dimensional measuring standard 1111, in the form of a so-called cross grating, on the object is scanned. In this case, the cross grating may be viewed as a superimposition of the first and second measuring standards of the first exemplary embodiment, with graduation regions oriented perpendicularly to each other, in a single measuring standard 1111, the first and second measuring standards likewise being rotated by 45° about third direction of movement y. As in the previously-described exemplary embodiments, the two retroreflector elements 1121', 1122' still extend along extension directions e1, e2 of the two—now superimposed—first and second measuring standards. However, first direction of movement x forms an angle of 45° with first extension direction e1, and second direction of movement z forms an angle of 45° with second extension direction e2. Moreover, this variant corresponds to the third exemplary embodiment of the optical position-measuring device described above.

Since in this variant, no separate grating tracks have to be provided on the measuring reflector, the measuring areas of the measuring reflector may be enlarged considerably. In this variant, it is also possible to use three conventional plane-mirror interferometers to determine the movement along third direction of movement y and the object rotations about first and second directions of movement x and z with extreme accuracy. Since the measuring beams of the plane-mirror interferometers likewise strike the cross grating of the two-dimensional measuring standard and are intended to be reflected by it without deflection to the greatest extent possible, it is considered advantageous to use a separate light source with a different wavelength for the plane-mirror interferometers. The different wavelength is selected such that the cross grating has a strong zeroth order of diffraction, and therefore reflects the incident light beam like when using a mirror.

It should be mentioned as a particular advantage of this variant that using it, in response to any movement along first or second direction of movement x or z, position signals result with regard to each direction of movement. In this manner, signal compensation is always possible. On the other hand, in the variants described above, in the case of a mere movement along the first or second direction of movement, only a position signal along this direction of movement is generated, that is, signal compensation is thereby not possible.

It should be understood that it is not necessary for the scanning plate—as provided in the respective exemplary embodiments described above—to be rectangular and have unused areas outside of the retroreflector elements. In an alternative variant, the scanning plate in cross-section may also be made up only of the retroreflector elements provided, etc.

What is claimed is:

1. An optical position-measuring device for detecting a position of an object in several degrees of freedom, the object being movable at least along a first direction of movement and along a second direction of movement, comprising:
    at least one light source;
    at least one first measuring standard, arranged on the object, extending along a first extension direction and including graduation regions arranged periodically along the first extension direction;
    at least one second measuring standard, arranged on the object, which extending along a second extension direction and including graduation regions arranged periodically along the second extension direction;
    a single scanning plate, including integrated first and second retroreflector elements, a length direction of the first retroreflector element extending parallel to the first extension direction and a length direction of the second retroreflector element extending parallel to the second extension direction, the first and second retroreflector elements adapted to reflect back in a direction of a respective measuring standard sub-beams that fall on the first and second retroreflectors from the first and second measuring standards; and
    a detector system adapted to generate, from superposed sub-beams, at least position signals with respect to movement of the object along the first and second directions of movement;
    wherein the retroreflector elements are arranged as diffractive retroreflector elements, including:
    a plurality of diffractive elements provided on a first side of the scanning plate;
    and at least one reflector element that is provided on an opposite second side of the scanning plate and having a reflective side oriented in a direction of the diffractive elements, the reflector element extending parallel to the first extension direction or the second extension direction.

2. The optical position-measuring device according to claim 1, wherein four diffractive elements per retroreflector element are provided on a first side of the scanning plate, so that a pair of sub-beams incoming from a first point of incidence on an associated measuring standard initially passes through first and second diffractive elements and in each instance is thereby focused and deflected to the reflector element on the opposite second side of the scanning plate, at the reflector element, the two sub-beams are reflected back to a third and fourth diffractive element, via which traversing sub-beams in each case are collimated and deflected in a direction of a second point of incidence on the associated measuring standard.

3. The optical position-measuring device according to claim 1, wherein the diffractive elements include locally limited transmission gratings provided on the first side of the scanning plate and having curved grating lines.

4. The optical position-measuring device according to claim 1, wherein the scanning plate includes an integrated third retroreflector element that extends parallel to the second extension direction, the third retroreflector element adapted to reflect back in a direction of the second measuring standard sub-beams that fall on the third retroreflector element from the second measuring standard.

5. The optical position-measuring device according to claim 1, wherein the first and second measuring standards include reflection gratings, and the graduation regions of the first and second measuring standards are oriented perpendicularly to each other.

6. The optical position-measuring device according to claim 5, wherein the first and second measuring standards are superimposed with each other in the form of a cross grating.

7. The optical position-measuring device according to claim 1, further comprising:
    at least one measuring reflector provided on the object;
    at least one beam-splitter element, mechanically coupled to the scanning plate, adapted to split a beam of rays falling on beam-splitter element into at least one measurement beam and at least one reference beam, so that at least one interferometer measuring arm is formed by the measurement beam propagating in a direction of the measuring reflectors, and an interferometer reference arm is formed by the reference beam; and
    an interferometer detector system adapted to generate, from superposed measurement and reference beams, position signals with respect to movement of the object along a third direction of movement that is oriented perpendicularly to the first and second directions of movement.

8. The optical position-measuring device according to claim 7, wherein the beam-splitter element, a plurality of diffractive elements, and at least one reflector element are integrated into the scanning plate, so that between the splitting at the beam-splitter element and the superposition with the measurement beam, the reference beam propagates exclusively in the scanning plate.

9. The optical position-measuring device according to claim 7, wherein the measuring reflector includes a diffractive element and a reflector element.

10. The optical position-measuring device according to claim 7, wherein at least three measurement beams, arranged symmetrically relative to each other, propagate in a direction of the at least one measuring reflector.

11. The optical position-measuring device according to claim 1, wherein a single light source is provided at least for scanning the first and second measuring standards.

12. The optical position-measuring device according to claim 1, wherein the first direction of movement is oriented parallel to the first extension direction, and the second direction of movement is oriented parallel to the second extension direction.

13. The optical position-measuring device according to claim 7, wherein at least one splitting element is adapted to direct at least a portion of the sub-beams to a position-sensitive electro-optical detector element adapted to detect a point of incidence of the sub-beams falling on the position-sensitive electro-optical detector element to determine the position of the object in the case of a rotation about at least one direction of movement.

14. The optical position-measuring device according to claim 13, wherein the first direction of movement forms an angle of 45° with the first extension direction, and the second direction of movement forms an angle of 45° with the second extension direction.

* * * * *